(12) United States Patent
Motoki

(10) Patent No.: US 6,359,843 B1
(45) Date of Patent: Mar. 19, 2002

(54) DISK RECORDING-PLAYBACK DEVICE, DISK TRAY FOR USE IN THE DEVICE, AND METHOD OF EJECTING THE TRAY

(75) Inventor: Masanori Motoki, Nara (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/665,595

(22) Filed: Sep. 19, 2000

Related U.S. Application Data

(62) Division of application No. 09/048,030, filed on Mar. 26, 1998, now abandoned.

(30) Foreign Application Priority Data

| Mar. 28, 1997 | (JP) | 9-76785 |
| Mar. 28, 1997 | (JP) | 9-77064 |
| Mar. 28, 1997 | (JP) | 9-77290 |
| Mar. 28, 1997 | (JP) | 9-78018 |
| Mar. 28, 1997 | (JP) | 9-78058 |

(51) Int. Cl.⁷ .......................... G11B 17/30; G11B 17/10
(52) U.S. Cl. .............. 369/30.92; 369/30.77; 369/30.85
(58) Field of Search .................. 369/178, 179, 369/191, 192, 194, 34, 36, 38, 30.76, 30.77, 30.78, 30.85, 30.87, 30.89, 30.9, 30.92, 30.99; 360/98.04, 98.05, 98.06

(56) References Cited

U.S. PATENT DOCUMENTS

| 5,226,032 A | * | 7/1993 | Ikedo et al. | 369/178 |
| 5,327,412 A | | 7/1994 | Lee | 369/178 |
| 5,329,516 A | * | 7/1994 | Hoshi et al. | 369/77.1 |
| 5,515,356 A | | 5/1996 | Lee | 369/178 |
| 5,726,967 A | | 3/1998 | Tanaka et al. | 369/178 |
| 5,751,687 A | | 5/1998 | Ariyoshi et al. | 369/178 |
| 5,790,508 A | | 8/1998 | Chen | 369/178 |
| 5,917,986 A | | 6/1999 | Kim | 369/191 |
| 5,933,403 A | | 8/1999 | Kim et al. | 369/178 |

FOREIGN PATENT DOCUMENTS

| JP | 1-66862 | | 3/1989 |
| JP | 6-150512 | | 5/1994 |
| JP | 6-195849 | | 7/1994 |
| JP | 07-282520 | * | 10/1995 |
| JP | 08-249800 | * | 9/1996 |
| JP | 8-297904 | | 11/1996 |
| JP | 09-185861 | * | 7/1997 |
| JP | 63-204548 | | 8/1998 |

* cited by examiner

Primary Examiner—David L. Ometz
(74) Attorney, Agent, or Firm—Armstrong, Westerman & Hattori, LLP

(57) ABSTRACT

Provided forwardly of a stacker accommodating trays in a plurality of stages for placing a disk on each tray is a recording-playback unit which is movable upward and downward for recording or reproducing data on or from the disk. A clamp plate covering the recording-playback unit is pivoted to the unit. When one of the trays is to be ejected from the stacker, the recording-playback unit is moved upward or downward to a level where the disk carrying face thereof is displaced from the tray to be ejected, to block the path of movement of the tray to the recording-playback unit with the clamp plate or the recording-playback unit, and the tray is thereafter ejected.

3 Claims, 38 Drawing Sheets

DISK INSERTING DIRECTION

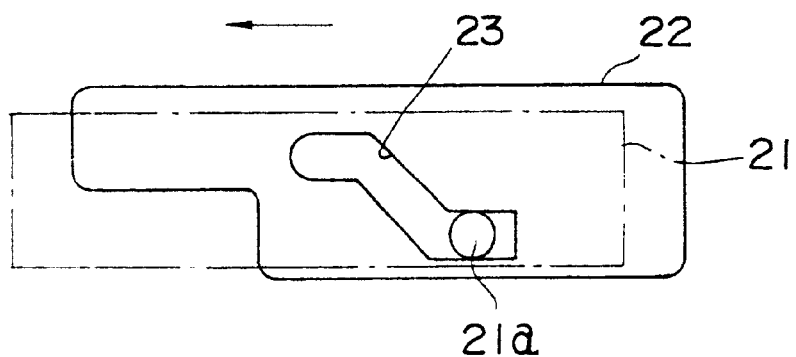
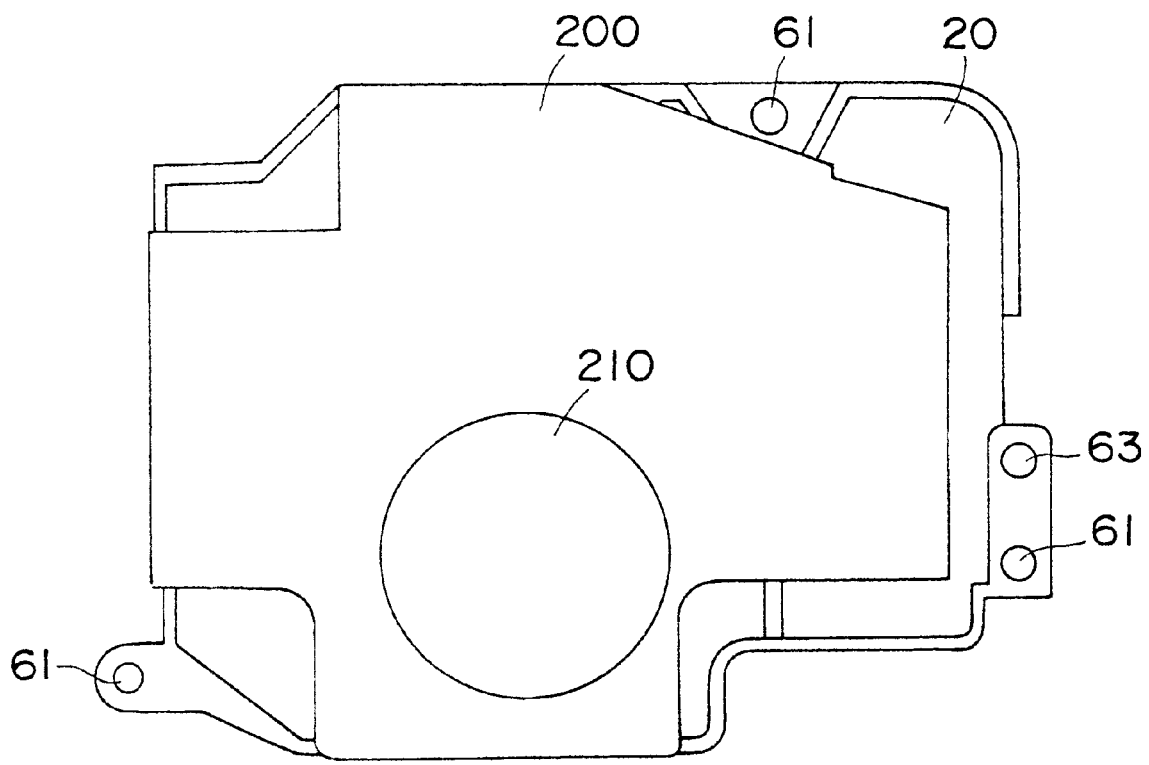

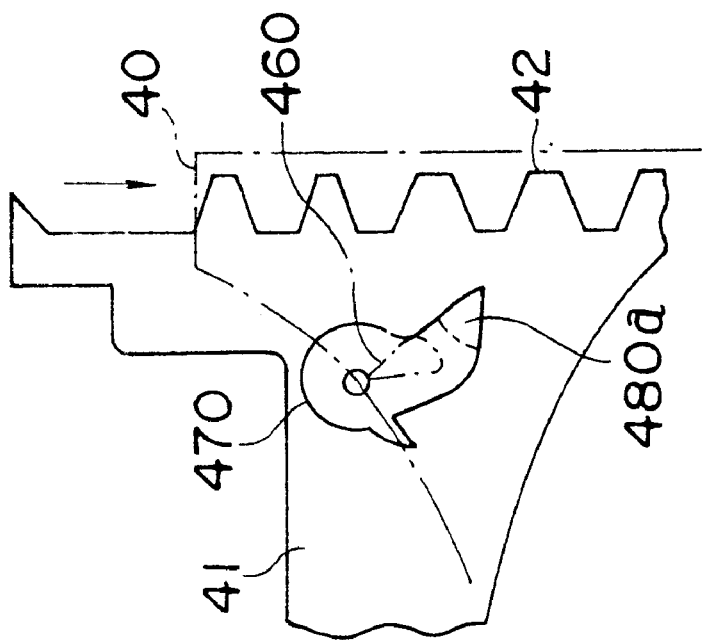
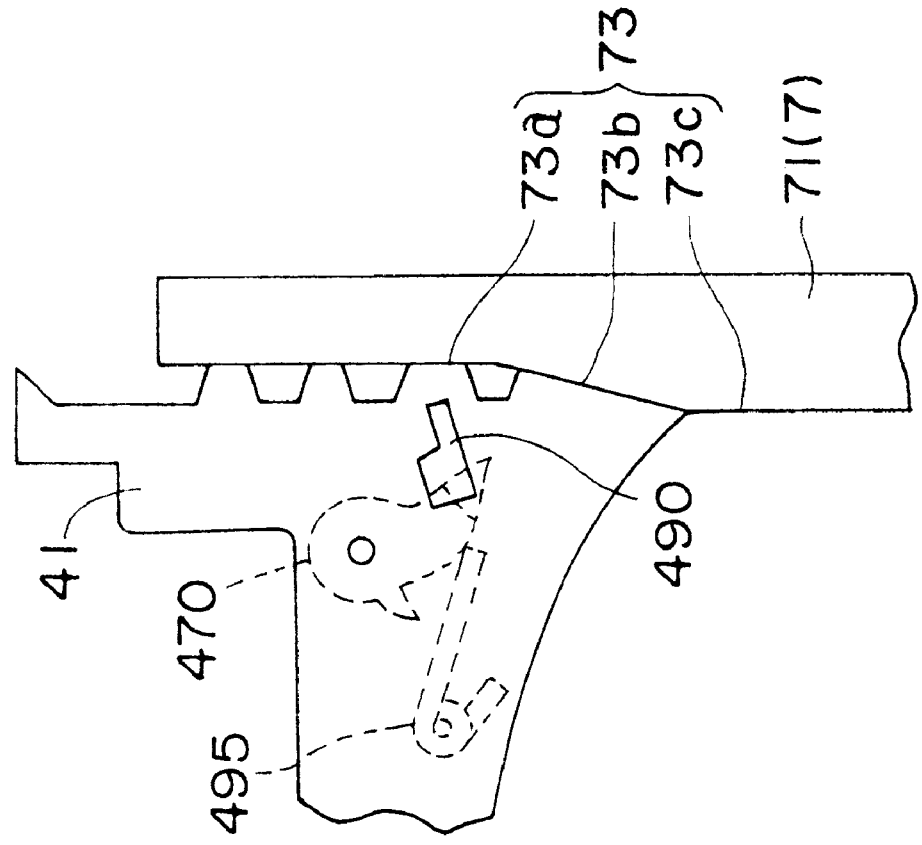

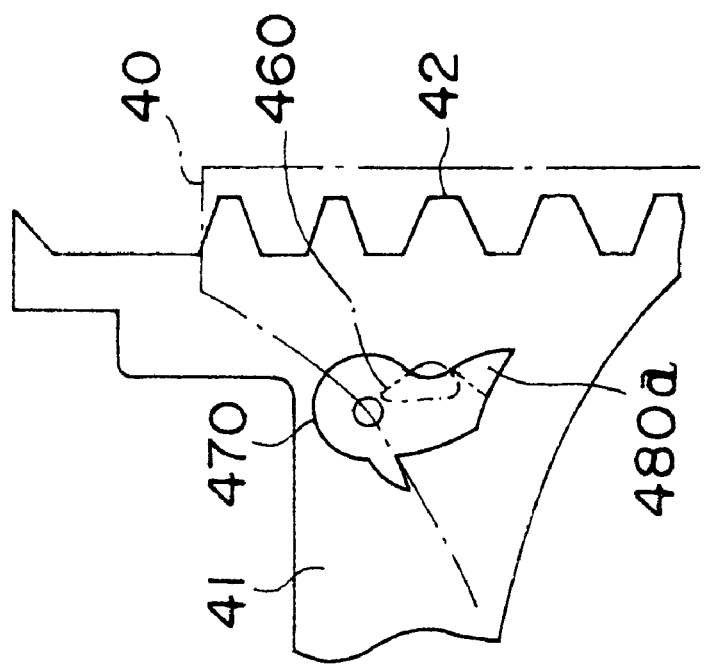
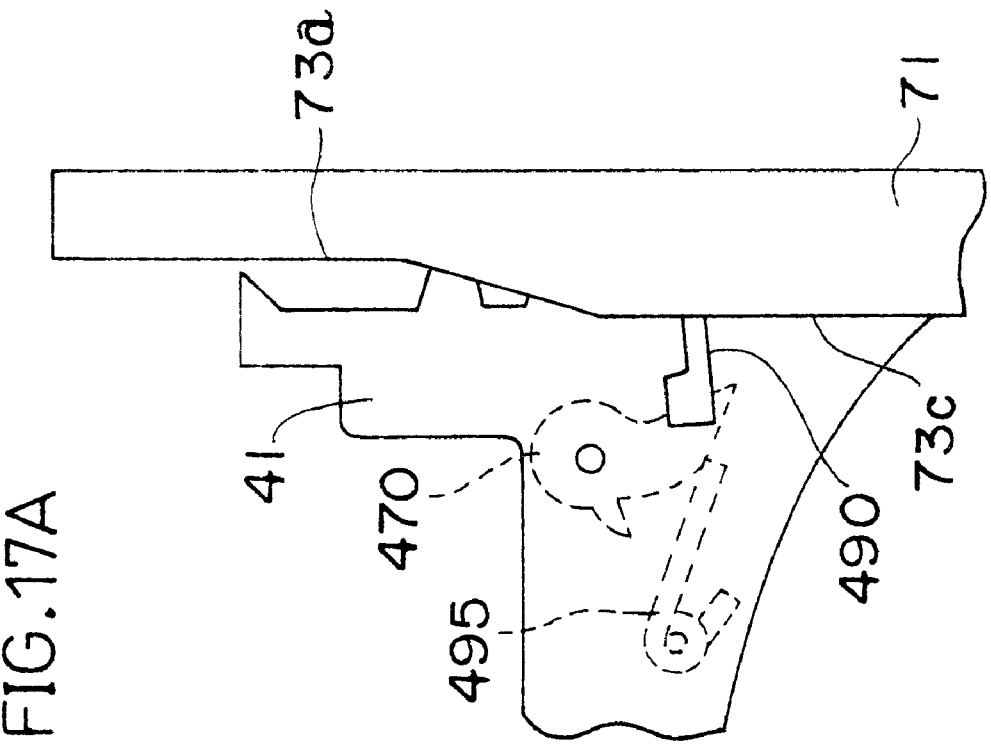
FIG.17B
FIG.17A

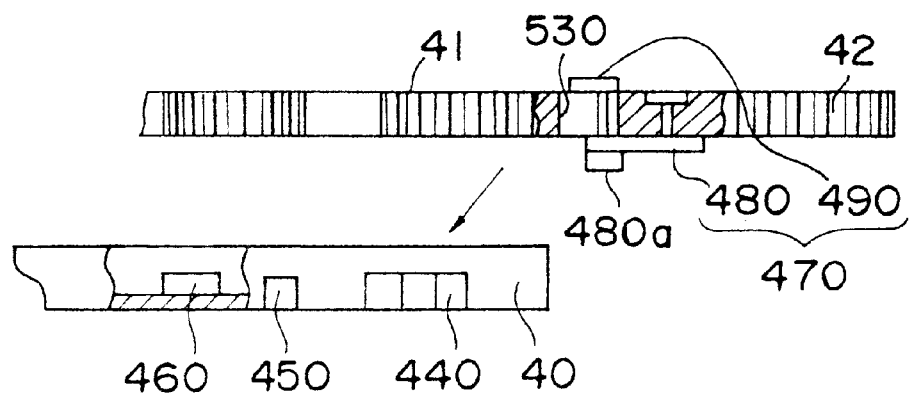
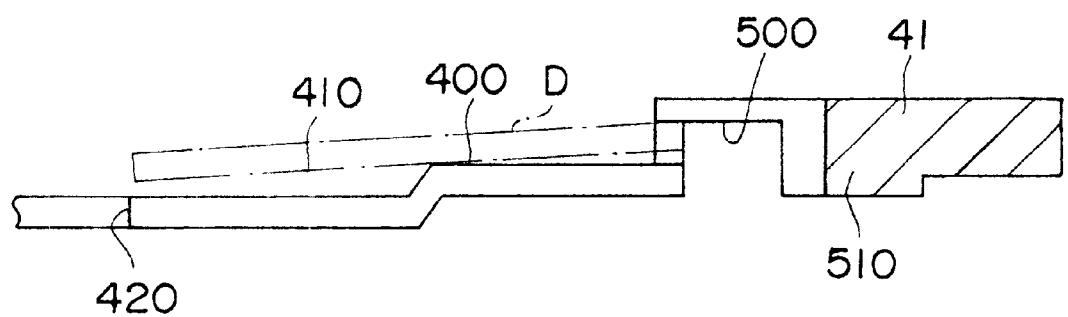

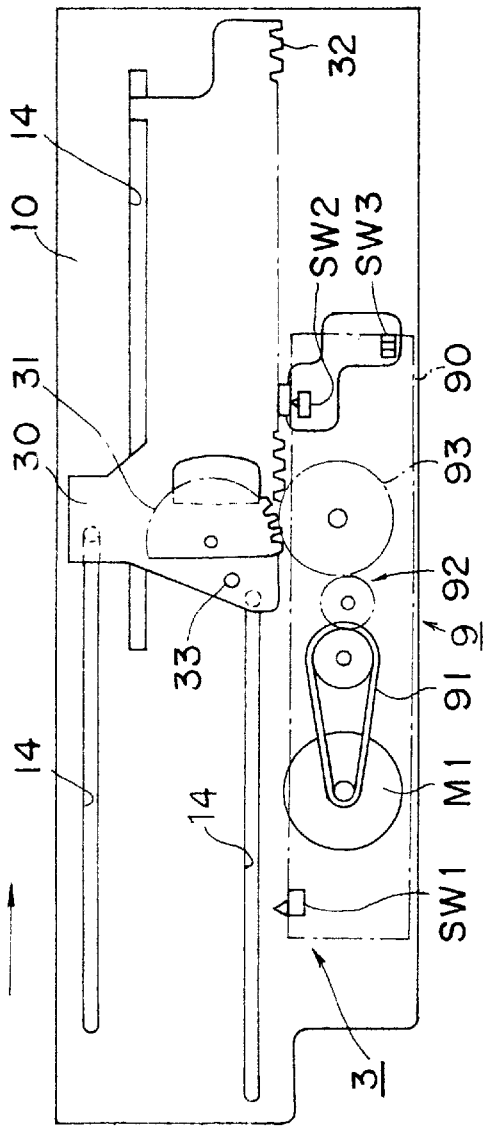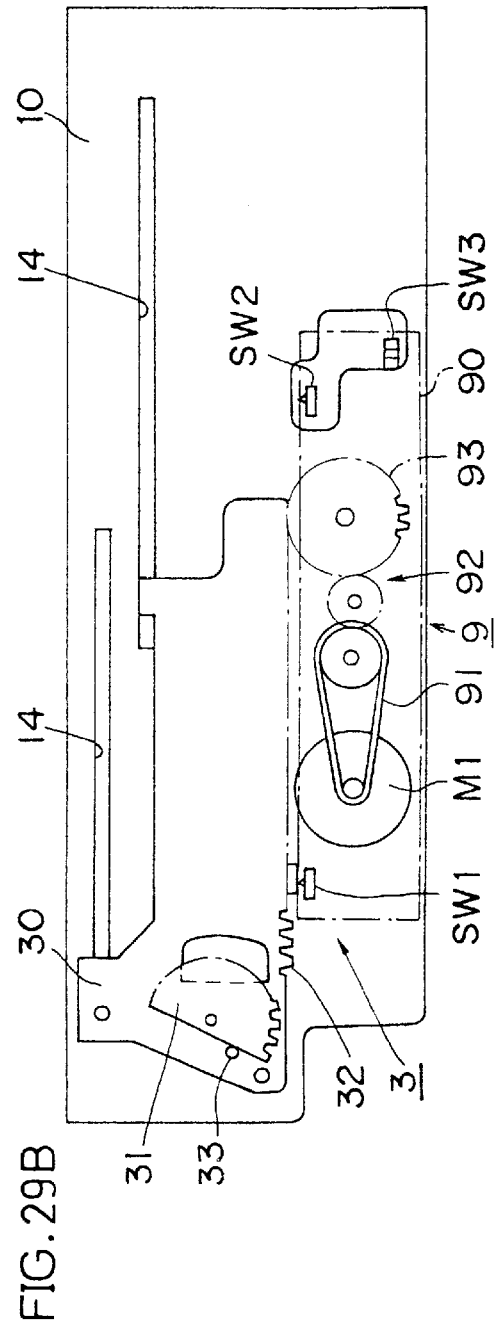

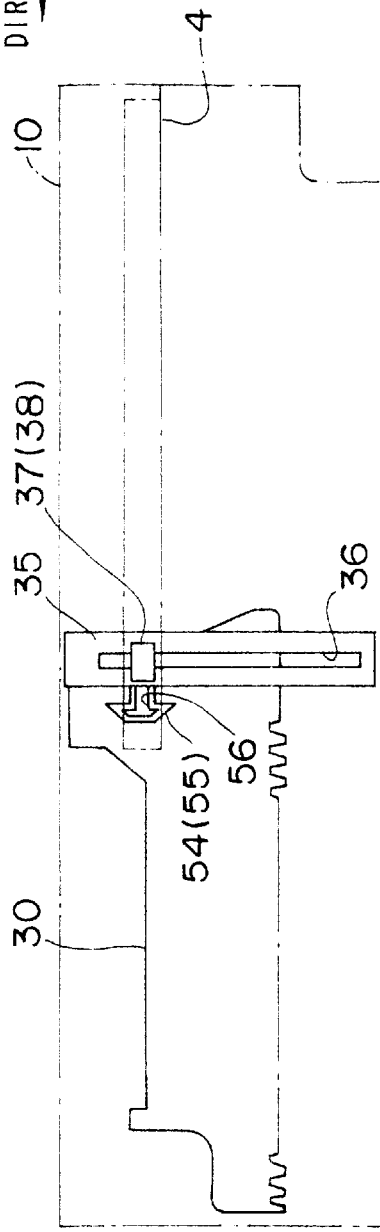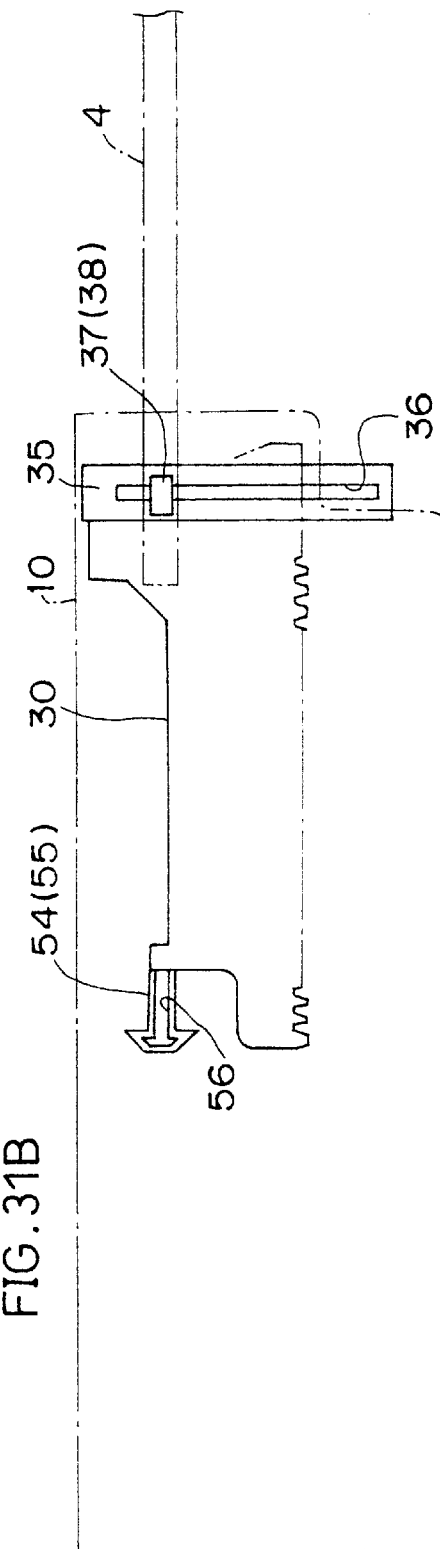

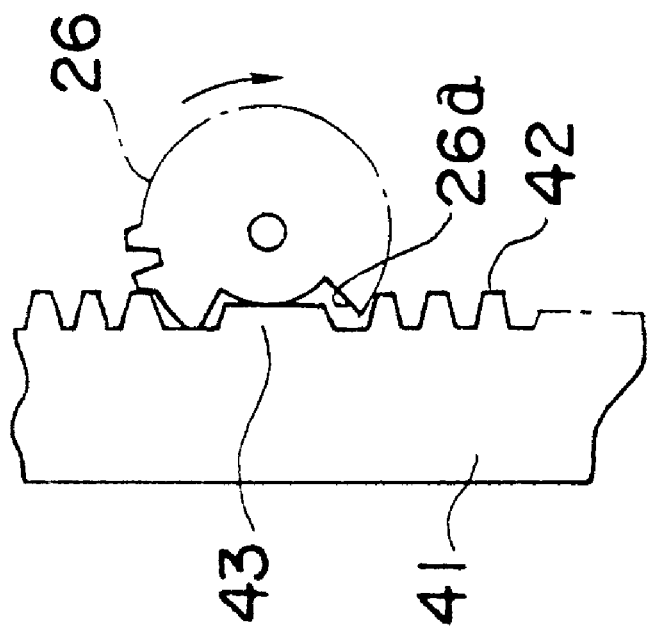
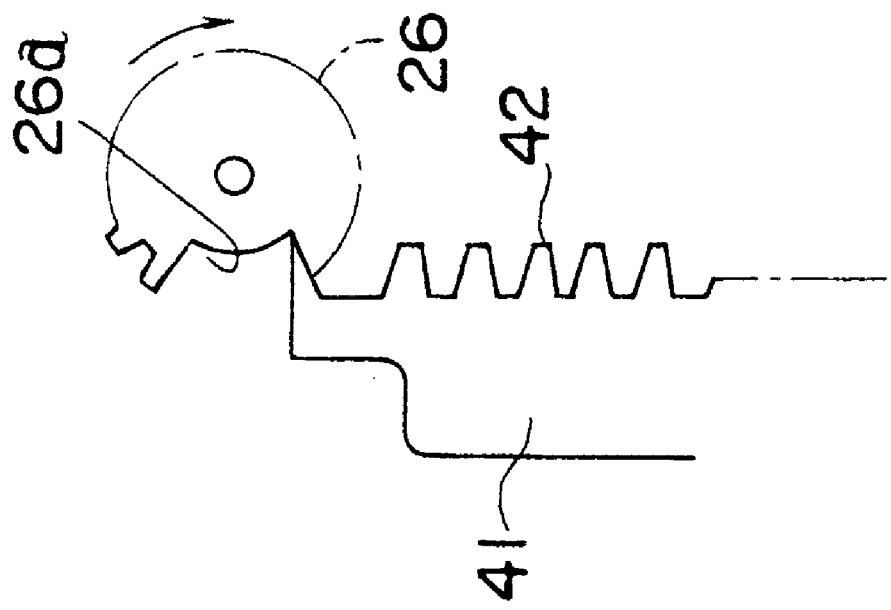

DISK RECORDING-PLAYBACK DEVICE, DISK TRAY FOR USE IN THE DEVICE, AND METHOD OF EJECTING THE TRAY

This application is a Division of prior application Ser. No. 09/048,030 filed Mar. 26, 1998 now abandoned.

FIELD OF THE INVENTION

The present invention relates to disk recording-playback devices for recording data on disks and reproducing the data therefrom, disk trays for use in the device, and a method of ejecting the tray.

BACKGROUND OF THE INVENTION

The present applicant has already proposed a disk recording-playback device as shown in FIG. 43 (see JP-A-297904/1996). The proposed device has in its main body 100 a stacker 7 accommodating trays 4 in a plurality of stages for placing a disk on each tray. Disposed forwardly of the stacker 7 is a holder 700 movable upward and downward for placing the tray 4 thereon as delivered from the stacker 7. A recording-playback unit 2 is disposed under the path of up-down movement of the holder 700.

The tray 4 is movable into and out of the stacker 7 rightward, i.e., in a loading direction, and leftward, i.e., in an ejecting direction, in FIG. 43. The tray 4 as stowed in the stacker 7 is held thereto by a latch mechanism (not shown). When to be loaded or ejected, the tray 4 is released from the stacker 7.

As shown in FIG. 44, the tray 4 has a large recess 400 for placing therein a disk with a diameter of 12 cm (hereinafter referred to as a "large disk "), and a small recess 410 positioned at a lower level than the large recess 400 concentrically therewith for placing therein a disk with a diameter of 8 cm (hereinafter referred to as a "small disk"). One of the large and small disks is placed on the tray 4. The tray 4 is formed with a window 420 as a common opening for the large and small recessed portions 400, 410. A recording or playback beam passes through the window 420. A specified tray 4 is loaded by vertically moving the holder 700 to the level of that tray 4 first, then delivering the tray 4 from the stacker 7 onto the holder 700 and lowering the holder 700 onto the recording-playback unit 2 to set the tray 4 in position on the unit 2.

When to be ejected, the specified tray 4 is released from engagement with the stacker 7 in the case of the conventional recording-playback device, so that if the device main body 100 is installed as inclined as seen in FIG. 46, the tray 4 is likely to slip out of the stacker 7 and fall onto the unit 2. The tray 4 is then not ejectable, and the disk in the tray 4 is likely to become damaged.

Further even if a fall of the tray 4 is avoidable, there is a likelihood of the disk D falling onto the unit 2 from the inclined tray 4. Especially, the small disk, which is in contact with the tray 4 over a small area, is in contact therewith with small friction and is liable to slip out.

An object of the present invention is to prevent the tray from falling toward the recording-playback unit and to prevent the small disk from slipping out of the tray when the device main body is installed as inclined.

SUMMARY OF THE INVENTION

The present invention provides a disk recording-playback device which has mounted on a chassis 1 a stacker 7 accommodating trays 4 in a plurality of stages for placing a disk on each tray, and a recording-playback unit 2 positioned forwardly of the stacker 7 for recording or reproducing data on or from the disk. The disk is held between the unit 2 and a clamp plate 200 positioned above the unit 2.

Further mounted on the chassis 1 are a deck lift unit 6 for raising and lowering the recording-playback unit 2, and lift control means positioned between the chassis 1 and the recording-playback unit 2 for operating the deck lift unit 6 to locate the recording-playback unit 2 at a desired level.

In the following description, the direction in which the tray 4 slidingly moves from the stacker 7 toward the recording-playback unit 2 will be referred to as "forward" or a "loading direction," and the direction from the unit 2 toward the stacker 7 as "rearward." The direction in which the tray 4 is delivered from the stacker 7 to the outside of the recording-playback device will be referred to as an "ejecting direction."

When one of the trays 4 is to be ejected from the stacker 7, the lift control means positions the recording-playback unit 2 as opposed to the tray 4 to be ejected and blocks the path of movement of the tray 4 to the unit 2 with the clamp plate 200 or the unit 2.

As shown in FIGS. 13 and 19, the tray 4 is provided with a slipping-off preventing piece 500 positioned forwardly of a large recessed portion 400 and lapping over an end part of the large recessed portion 400, and a contact wall 510 positioned forwardly of the piece 500. When a disk is about to forwardly slip out of a small recessed portion 410, the piece 500 comes into contact with the upper surface of the disk, and the contact wall 510 comes into contact with the peripheral edge of the disk, preventing the disk from slipping out of the tray 4.

Even when the tray 4 to be ejected is about to slip off forward in the case where the main body of the device is installed as inclined on a desk, the path of movement of the tray 4 to the recording-playback unit 2 is blocked with the clamp plate 200 or the unit 2. This obviates the likelihood that the tray 4 to be ejected will fall toward the unit 2.

Even if the tray 4 is prevented from falling toward the unit 2, there is a likelihood of a small disk on the tray 4 slipping out forward. However, even in such a case, the disk has its upper surface confined by the slipping-off preventing piece 500, with its peripheral edge in contact with the contact wall 510. Accordingly, the small disk is prevented from slipping out of the tray 4.

BRIEF DESCRIPTION OF THE DRAWINGS

FIG. 6 is a front view of an operating slide;

FIG. 7 is a plan view showing the clamp plate as positioned over the recording-playback unit;

FIG. 16 includes plan views showing the positional relationship between the subtray and the main tray in the closed position, (a) showing the position of the latch lever and a cam portion relative to each other, (b) showing the position of the latch lever and a catch piece relative to each other;

FIG. 17 includes plan views showing the main tray and the subtray in engagement therewith in the course of travel from the closed position to the ejected position; (a) showing the position of the latch lever and the cam portion relative to each other, (b) showing the position of the latch lever and the catch piece relative to each other;

FIG. 18 is a side elevation partly broken away and showing the main tray and the subtray;

FIG. 19 is a view in section taken along the line B—B in FIG. 13 and showing a forward end portion of the subtray;

FIG. 29 includes side elevations of an opening-closing slide, (a) showing the closed position, (b) showing the ejected position;

FIG. 31 includes side elevations of the opening-closing slide and the tray, (a) showing the closed position, (b) showing the ejected position;

FIG. 33 includes plan views of a drive gear and the subtray, (a) showing the closed position, (b) showing a large tooth of a rack as fitted in a cutout during the sliding movement of the subtray;

DETAILED DESCRIPTION OF THE PREFERRED EMBODIMENTS

Entire Construction

An embodiment of the invention will be described below in detail. The same construction as the conventional device will be referred to with use of the same numerals as used for the conventional device and will not be described in detail.

Figure 1A:
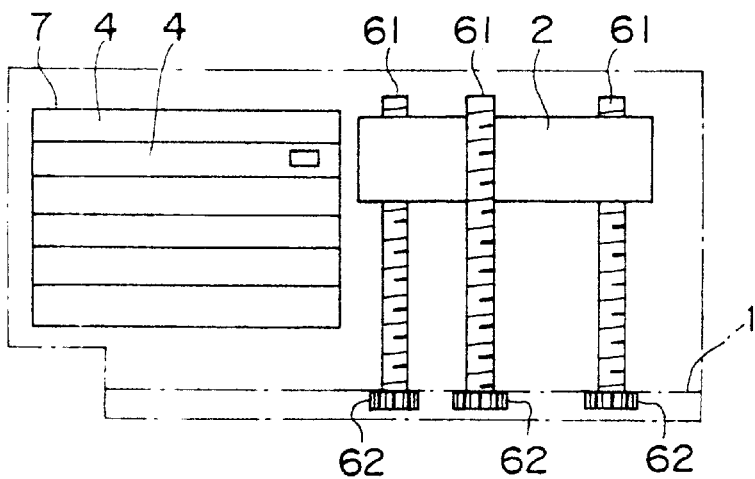
FIG. 1 includes side elevations generally showing the operation of a disk recording-playback device, (a) showing trays in a closed position, (b) showing one of the trays in an ejected position, and (c) showing a recording-playback unit during ascent or descent in (c)
Figure 1B:
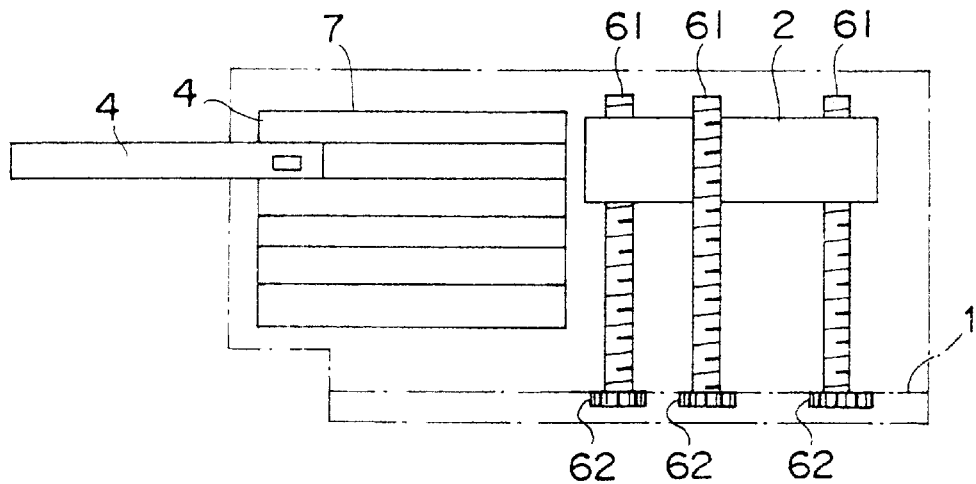
Figure 1C:
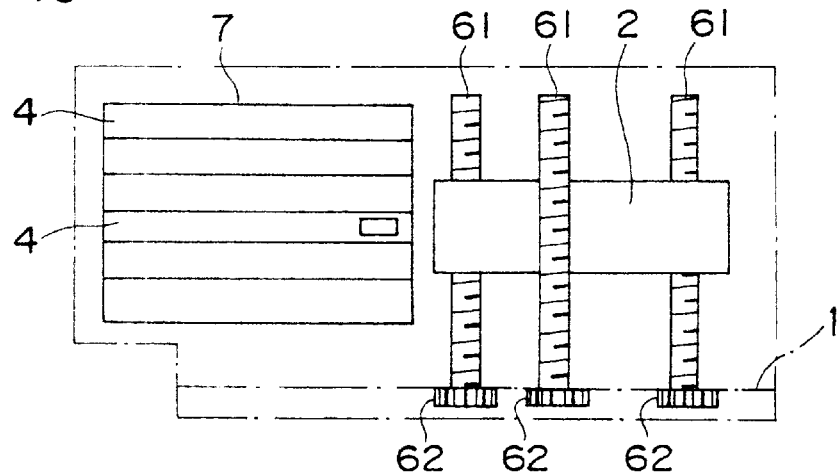

FIG. 1, (a), (b) and (c) are side elevations schematically showing the present device. At one side of the device closer to the user operating the device, a stacker 7 is provided which has accommodated therein a plurality of trays 4 as arranged one above another and each adapted to carry a disk thereon. The trays,4 are fitted in the respective stages of the stacker 7 and movable into and out of stacker. Disposed forwardly of the stacker 7 is a recording-playback unit 2 movable upward and downward in screw-thread engagement with three worms 61, 61, 61 extending upright from a chassis 1 for receiving a disk transported by the tray 4. Data is recorded on or reproduced from the disk by the unit 2.

When a new disk is to be stowed in the stacker 7, one of the trays 4 is withdrawn from the stacker 7 as seen in FIG. 1, (b), and the disk is placed on the tray 4. When an operation button (not shown) is pressed, the tray 4 is retracted into the stacker 7 as seen in FIG. 1, (a). The tray sliding mechanism 3 to be described later performs this retracting movement.

To use a desired disk within the stacker 7 for recording or playback, the unit 2 is moved upward or downward and opposed to the tray 4 carrying the desired disk as shown in FIG. 1, (c). The disk is then transported onto the unit 2. As will be described later, the tray 4 comprises a subtray 41 and a main tray 40 in combination (see FIG. 13). The disk is placed only on the subtray 41, which slidingly moves toward the unit 2. The disk is ready for recording or playback when the subtray 41 is placed onto the unit 2.

As will be described later, the present disk recording-playback device has, in addition to the recording-playback unit 2 and the tray sliding mechanism 3, a coupling unit 5 which moves upward and downward in operative relation with a deck lift unit 6 for raising and lowering the unit 2 and with the tray sliding mechanism 3 and which couples the tray 4 to be slidingly moved to the tray sliding mechanism 3.

Figure 3:
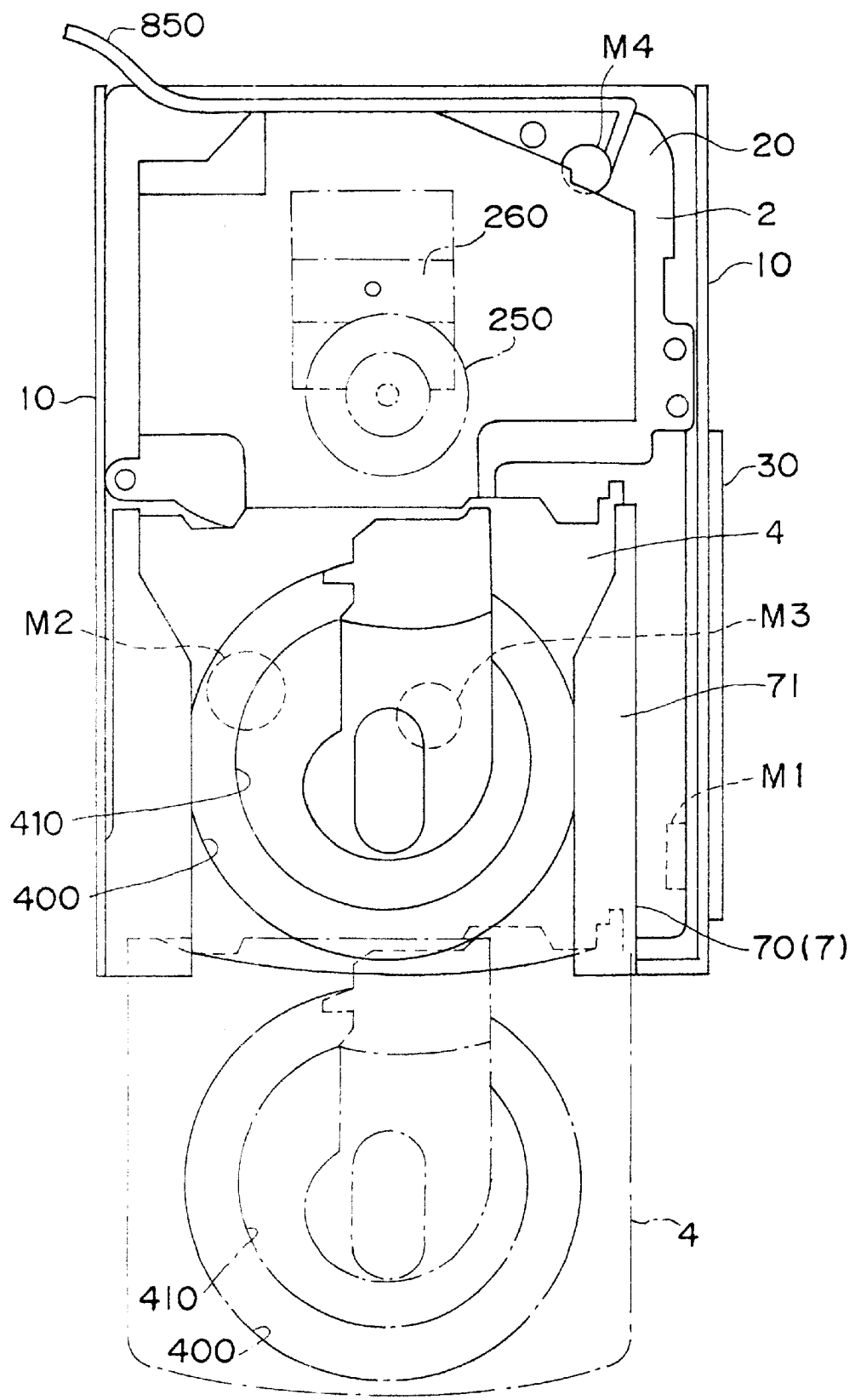
FIG. 3 is a plan view showing the tray in the closed position and the ejected position relative to the recording-playback unit.

FIG. 3 is a plan view showing the. tray 4 as ejected, i e., as slidingly moved rearward. The tray 4 is slidable between a closed position wherein the tray 4 is stowed in the stacker 7 and an ejected position as moved outward from the stacker 7. The tray sliding mechanism 3 is driven by a motor Ml provided at a side portion of the device, and the deck lift unit 6 and the coupling unit 5 respectively by motors M2, M3 mounted on the chassis 1. The disk is transported to the recording-playback unit 2 by a motor M4. An electric wire 850 from the motor M4 is provided along the rear side of the unit 2 so as not to interfere with the unit during its ascent or descent.

Figure 2:
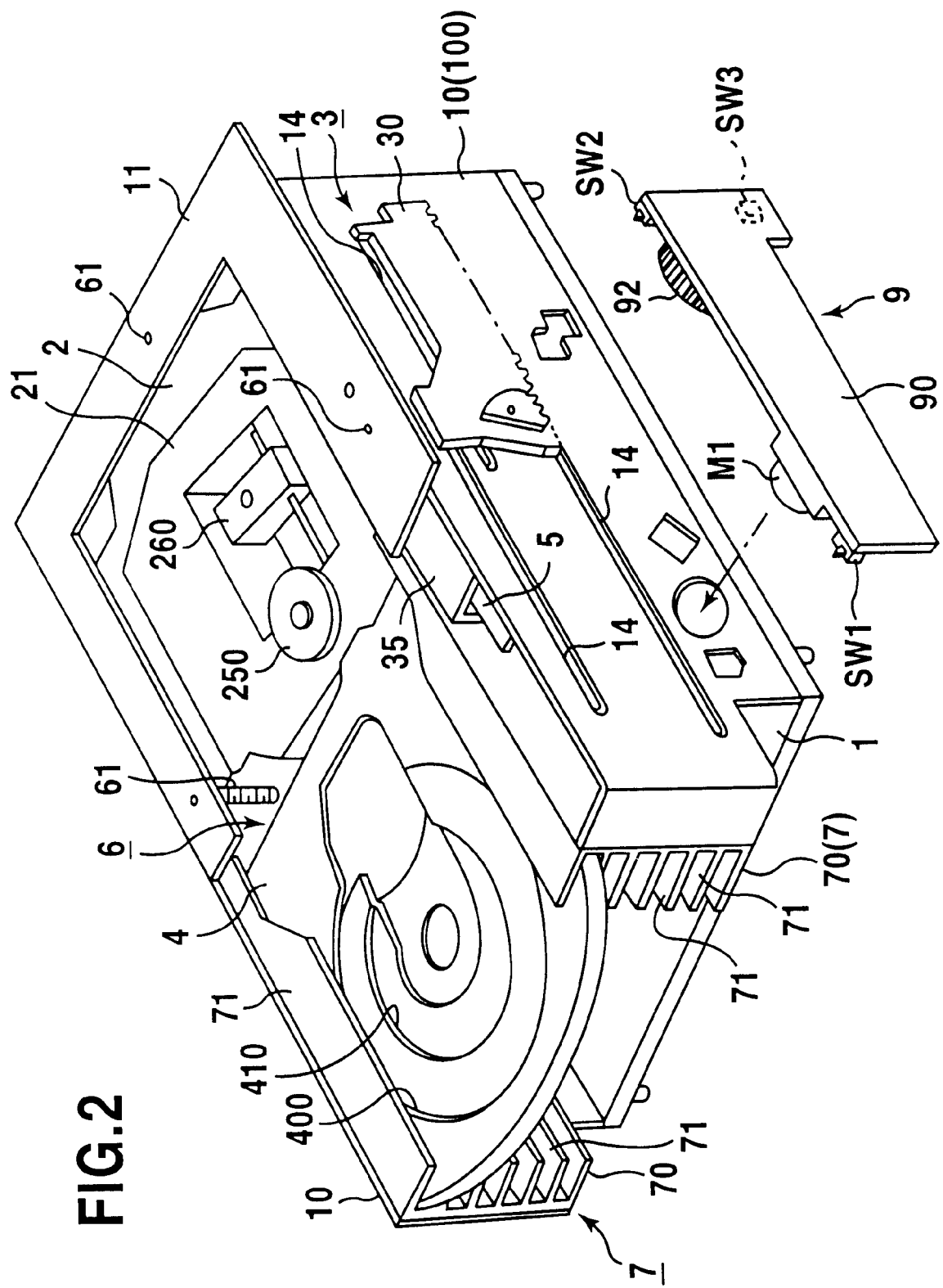
FIG. 2 is a perspective view of the disk recording-playback device.

FIG. 2 is a perspective view of the entire recording-playback device. As is well known, the recording-playback unit 2 comprises a turntable 250 for rotating the disk, and a pickup 260 for projecting a beam on the rear surface of the disk for recording or playback. Although the unit 2 is provided at its top with a clamp 210 for holding the disk in pressing contact with the turntable 250, the clamp 210 is not shown in FIG. 2 for the sake of brevity of description.

The stacker 7 comprises a pair of stacker pieces 70, 70 arranged at left and right on the chassis 1 as opposed to each other. Each of the stacker pieces 70 is provided with guide plates 71 arranged in a multiplicity of stages for supporting the trays 4 in bearing contact with the upper and lower sides thereof. Six trays 4 are accommodated in the stacker 7 of the embodiment.

Arranged outside the stacker pieces 70, 70 are respective side plates 10, 10 making the main body 100 of the device. The coupling unit 5, which is slidable forward and rearward, is disposed in a space between the stacker piece 70 and the side plate 10 at right as seen in FIG. 2.

An opening-closing slide 30 providing the tray sliding mechanism 3 is disposed outside the right slide plate 10. The slide 30 is movable forward and rearward along slits 14, 14, 14 formed in the side plate 10 and driven by a motor unit 9 mounted on the side plate 10.

A top plate 11 is provided over the unit 2 to interconnect the side plates 10, 10. The three worms 61, 61, 61 have their upper ends fitted to and held by the top plate 11.

Figure 4:
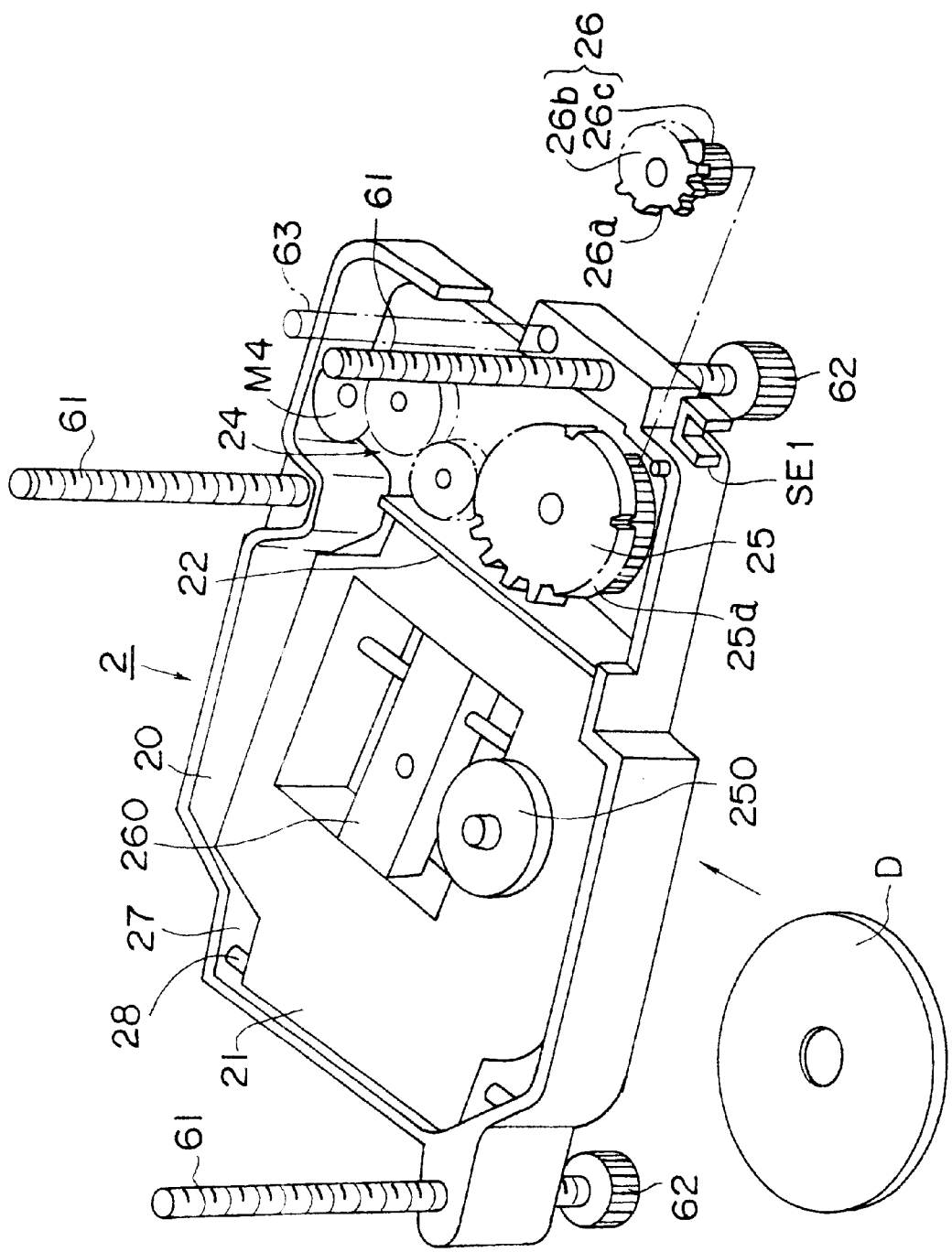
FIG. 4 is a perspective view of the recording-playback unit.
Figure 5:
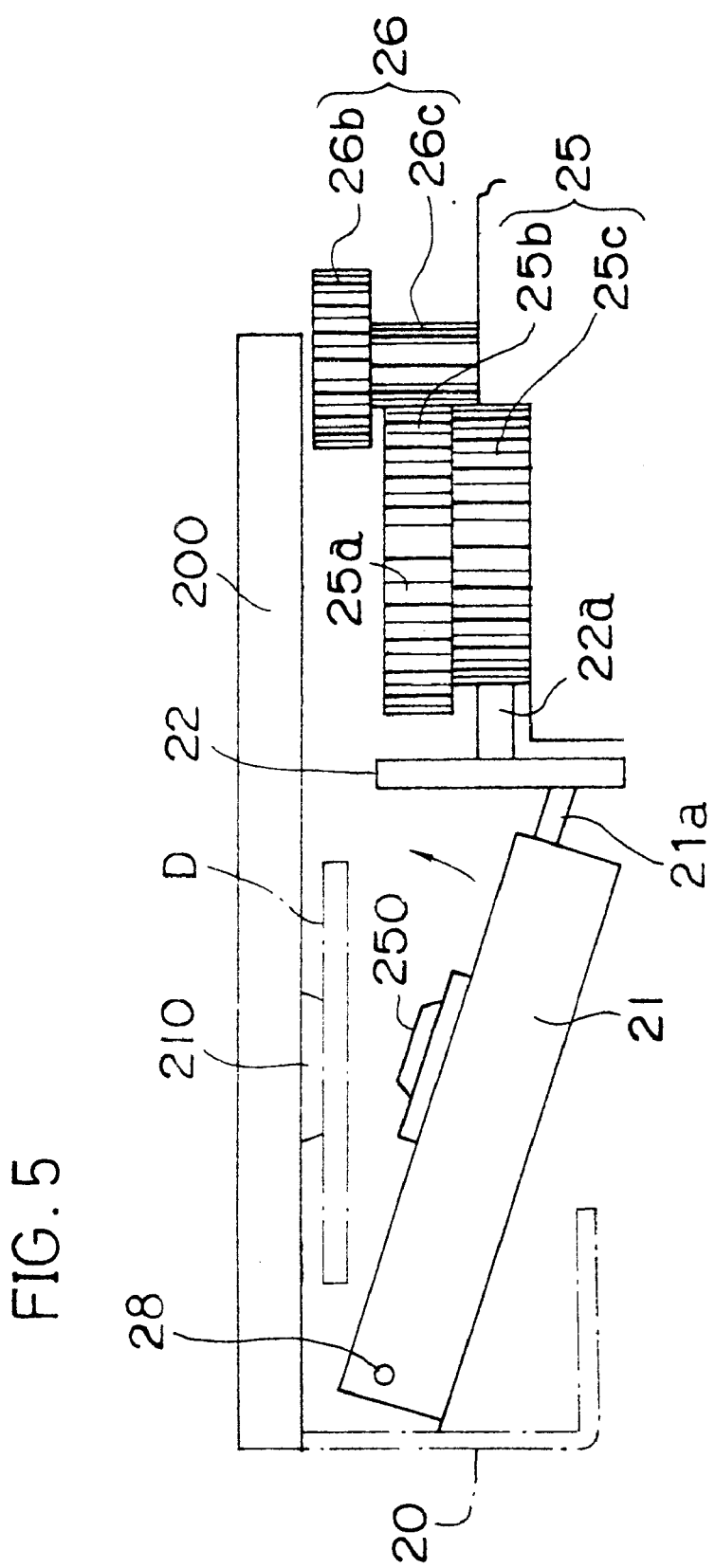
FIG. 5 is a front view showing the positional relationship between the unit and a clamp plate.

FIG. 4 is a perspective view of the recording-playback unit 2, and FIG. 5 is a fragmentary side elevation of the same. The unit 2 has a lift holder 20 in screw-thread engagement with the worms 61, 61, 61. The holder 20 is made of synthetic resin, fitted to a guide rod 63 extending upward from the chassis 1 and thereby guided for upward and downward movement. Each worm 61 carries at its lower end a gear 62, which is positioned in a recessed portion 13 of the chassis 1 (see FIG. 10).

The holder 20 shown in FIG. 4 is formed with a large opening 27 extending vertically therethrough. A movable support 21 having the pickup 260 and the turntable 250 mounted thereon is supported at a side portion thereof by a pivot 28 provided across the opening 27. A sensor SEl for detecting the level of the unit 2 is disposed in the vicinity of a drive gear 26 at a side portion of the lift holder 20.

Arranged at the right side of the large opening 27 are the motor M4 and a gear train 24 for transmitting the power from the motor M4. An operating gear 25 positioned at the downstream end of the gear train 24 comprises an upper gear 25b and a lower gear 25c which are each toothed only at a portion of the outer periphery. The upper gear 25b of the operating gear 25 is in mesh with the drive gear 26 positioned at one end of the lift holder 20. The drive gear 26 comprises an upper gear 26b and a lower gear 26c and meshes with the tray 4 as will be described later. The upper gear 26b has a cutout 26a locally in its outer periphery.

With reference to FIG. 5, the lower gear 25c of the operating gear 25 meshes with a toothed face 22a of an operating slide 22 provided at one side of the large opening 27 in the lift holder 20 to move the slide 22 forward and rearward. Thus, the motor M4 for the unit 2 drives the operating slide 22 and also drives the tray 4 toward and away from the unit 2.

Figure 40A:
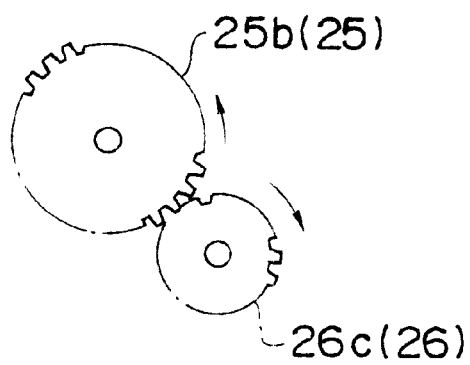
FIG. 40 includes plan views of gears on the recording-playback unit, (a) showing the drive gear in mesh with an operating gear, (b) showing the operating gear in mesh with the operating slide.
Figure 40B:
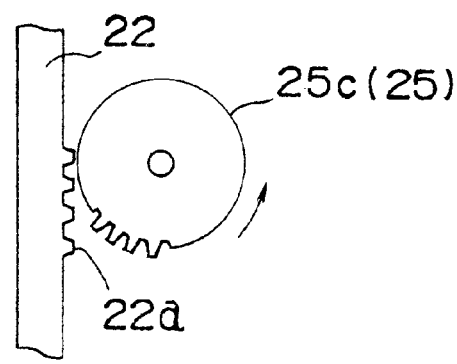
Figure 41A:
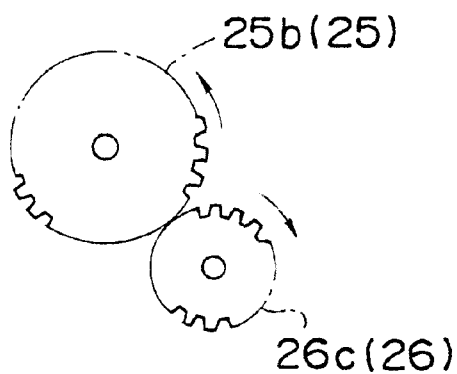
FIG. 41 includes plan views showing the gears on the recording-playback unit, with the tray further slidingly moved from the state shown in FIG. 40, (a) showing the drive gear in mesh with the operating gear, (b) showing the operating gear in mesh with the operating slide.
Figure 41B:
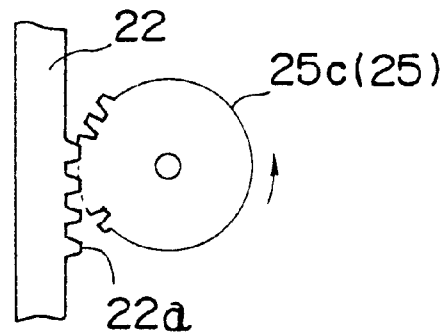

The drive gear 26 and the.operating gear 25 provide a Geneva motion, such that the gears 26, 25 are in mesh with each other only in a specified section and thereafter brought out of meshing engagement. The plan views (a) and (b) of each of FIGS. 40, 41 show the operating gear 25 in or out of mesh with the drive gear 25 and with the operating slide 22, respectively. As shown in FIG. 40, (a) and (b), the lower gear 26c of the drive gear 26 is initially in mesh with the upper gear 25b of the operating gear 25, and the lower gear 25c is initially out of mesh with the operating slide 22.

The drive gear 26 is rotated clockwise from this state by the operating gear 25, causing the upper gear 26b to draw in the subtray 41 as will be described later. When the tray 4 is completely drawn in, the upper gear 25b of the operating gear 25 comes out of mesh with the lower gear 26c of the drive gear 26, and the lower gear 25c meshes with the operating slide 22 as seen in FIG. 41, (a) and (b). In this state, the drive gear 26 is at a halt, while the operating slide 22 slides along forward or rearward. This mechanism has already been disclosed by the present applicant in JP-A-297904/1996.

FIG. 6 shows the operating slide 22 as it is viewed from the large opening (27) side. The slide 22 is formed with a cam groove 23 having fitted therein a pin 21a projecting from a free end of the movable support. 21. Accordingly the movable support 21 pivotally moves about the pivot 28 when the operating slide 22 is moved forward or rearward by the rotation of the motor M4 delivered to the slide 22 via the gear train 22.

With reference to FIG. 5, the upper side of the lift holder 20 is covered with a clamp plate 200, which is provided with the aforementioned clamp 210 for pressing the disk against the turntable 250 as is well known. The movable support 21 rotates upward, joining the turntable 250 to the clamp 210, with the disk D transported to the recording-playback unit 2, whereby the disk D is rotatably held. As seen in FIG. 7, the clamp plate 200 is clear of the worms 61, 61, 61 and the guide rod 63 and will not interfere with the lift holder 20 when the holder moves up and down.

Deck Lift Unit

Figure 8:
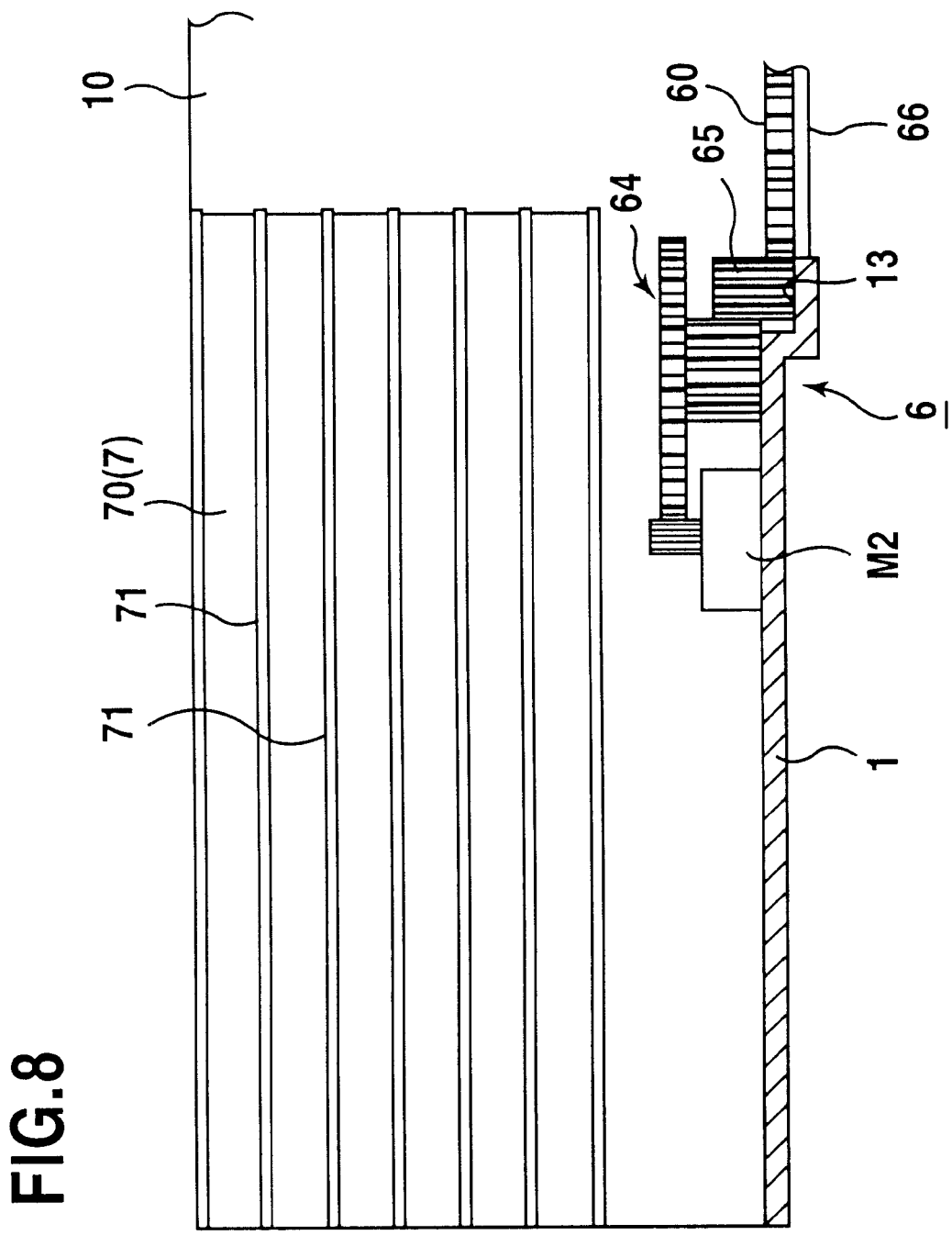
FIG. 8 is a side elevation showing a left stacker piece as it is seen from inside.
Figure 9:
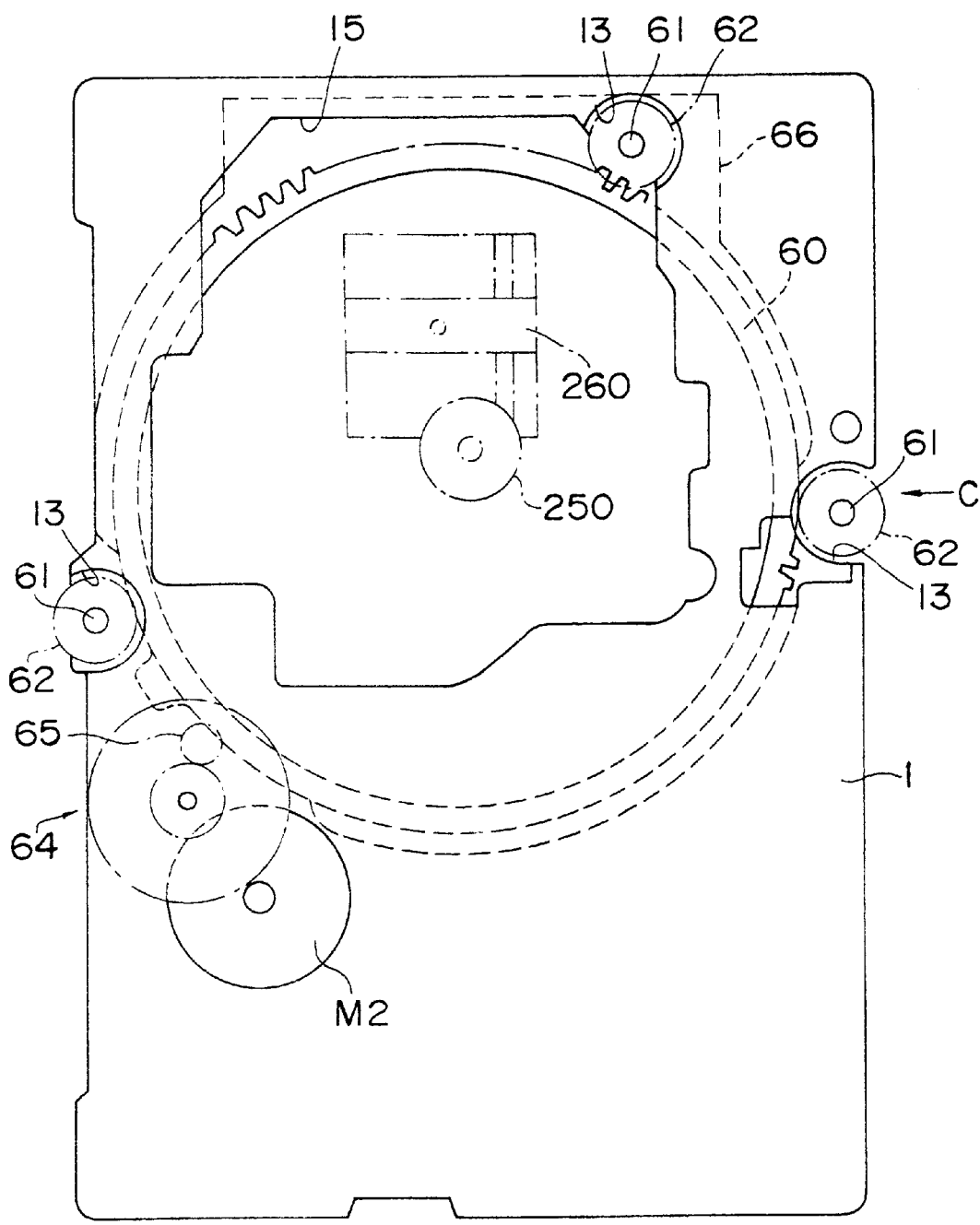
FIG. 9 is a plan view of a chassis having an annular gear mounted thereon.
Figure 10:
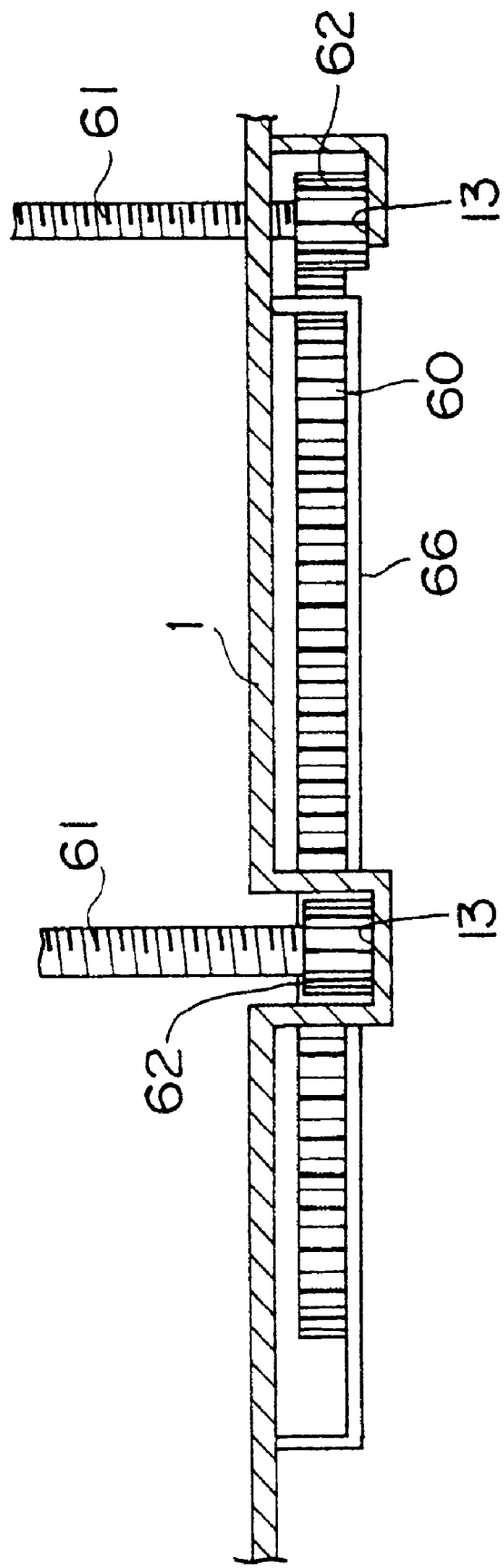
FIG. 10 is a side elevation showing the chassis in section as it is seen in the direction of arrow C in FIG. 9.

FIG. 8 is a side elevation showing the stacker piece 70 at left as it is seen from inside, FIG. 9 is a plan view of the chassis with the stacker 7 removed, and FIG. 10 is a side elevation of the chassis as it is seen in the direction of arrow C in FIG. 9.

Mounted on the chassis 1 under the left stacker piece 70 are the motor M2 and a gear train 64 coupled to the motor M2. A gear 65 at the downstream end of the gear train 64 is mounted on one of the recessed portions 13 of the chassis 1.

With reference to FIG. 9, the chassis 1 is formed with an opening 15 at a position corresponding to the recording-playback unit 2. An annular gear 60 is provided under the opening 15 and attached to the rear side of the chassis 1. The annular gear 60 is positioned on a bracket 66 attached to the rear side of the chassis 1 and meshes with the gears 62 on the worms 61.

The gear 65 of the gear train 64 is in mesh with the annular gear 60, transmitting the torque of the motor M2 to the gear 60. When driven, the motor M2 rotates the annular gear 60 and the three worms 61, 61, 61 via the gear train 64. The rotation of the worms 61 causes the lift holder 20, which is guided by the guide rod 63, to raise or lower the recording-playback unit 2. Thus, the unit 2 is opposed to the tray 4 carrying the disk to be used for recording or playback [see FIG. 1, (c)].

As shown in FIG. 9, the pickup 260 and the turntable 250 of the unit 2 are positioned inside the circular space of the annular gear 60, whereby even if the unit 2 is in its lowermost position, the circuit components (not shown) attached to the bottom faces of the pickup 260 and the turntable 250 and exposed from under the chassis opening 15 are precluded from coming into contact with the annular gear 60, permitting smooth rotation of the annular gear 60.

Detailed Description of Tray

Figure 11:
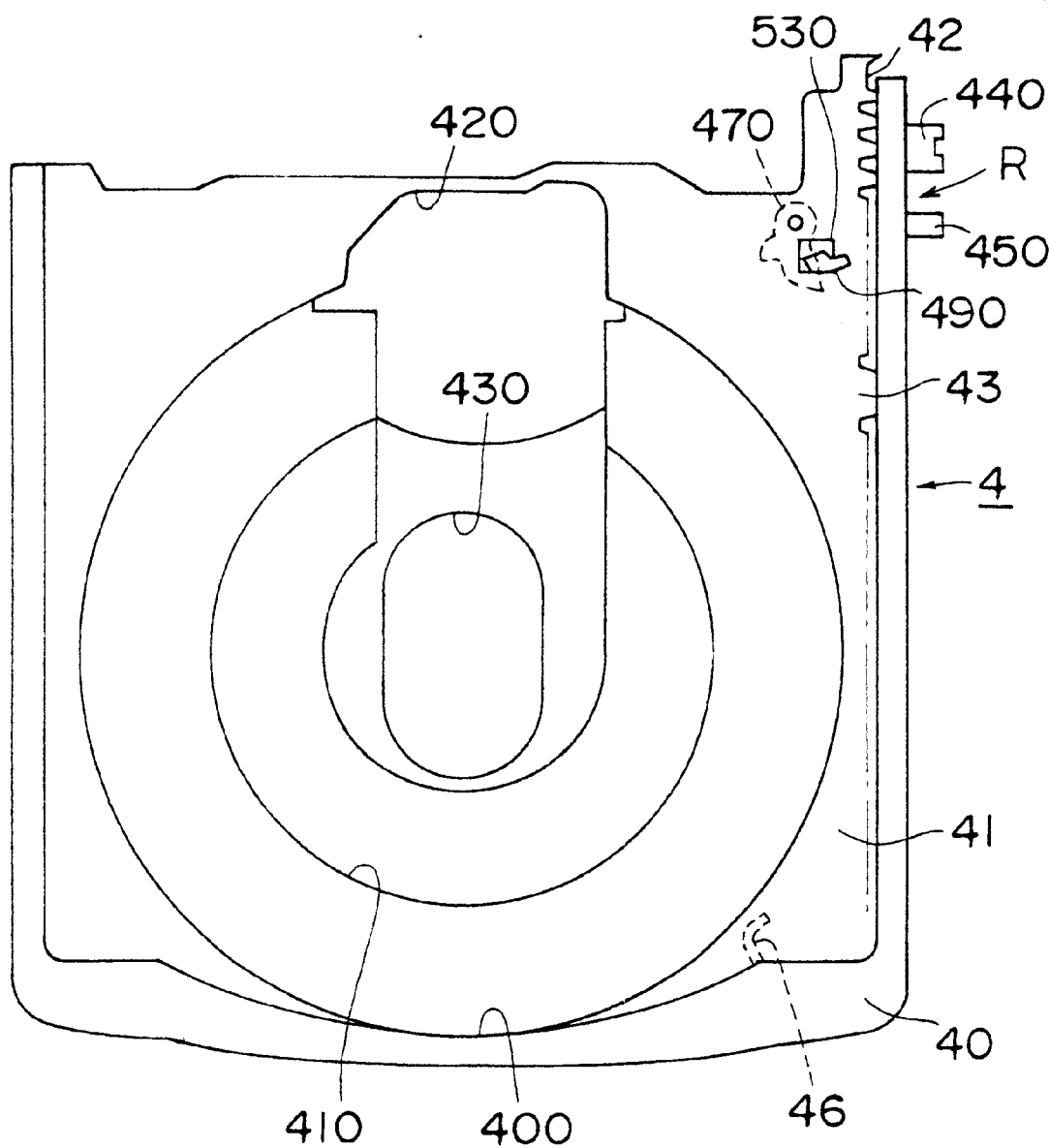
FIG. 11 is a plan view of a main tray and a subtray lapping over the main tray.
Figure 13:
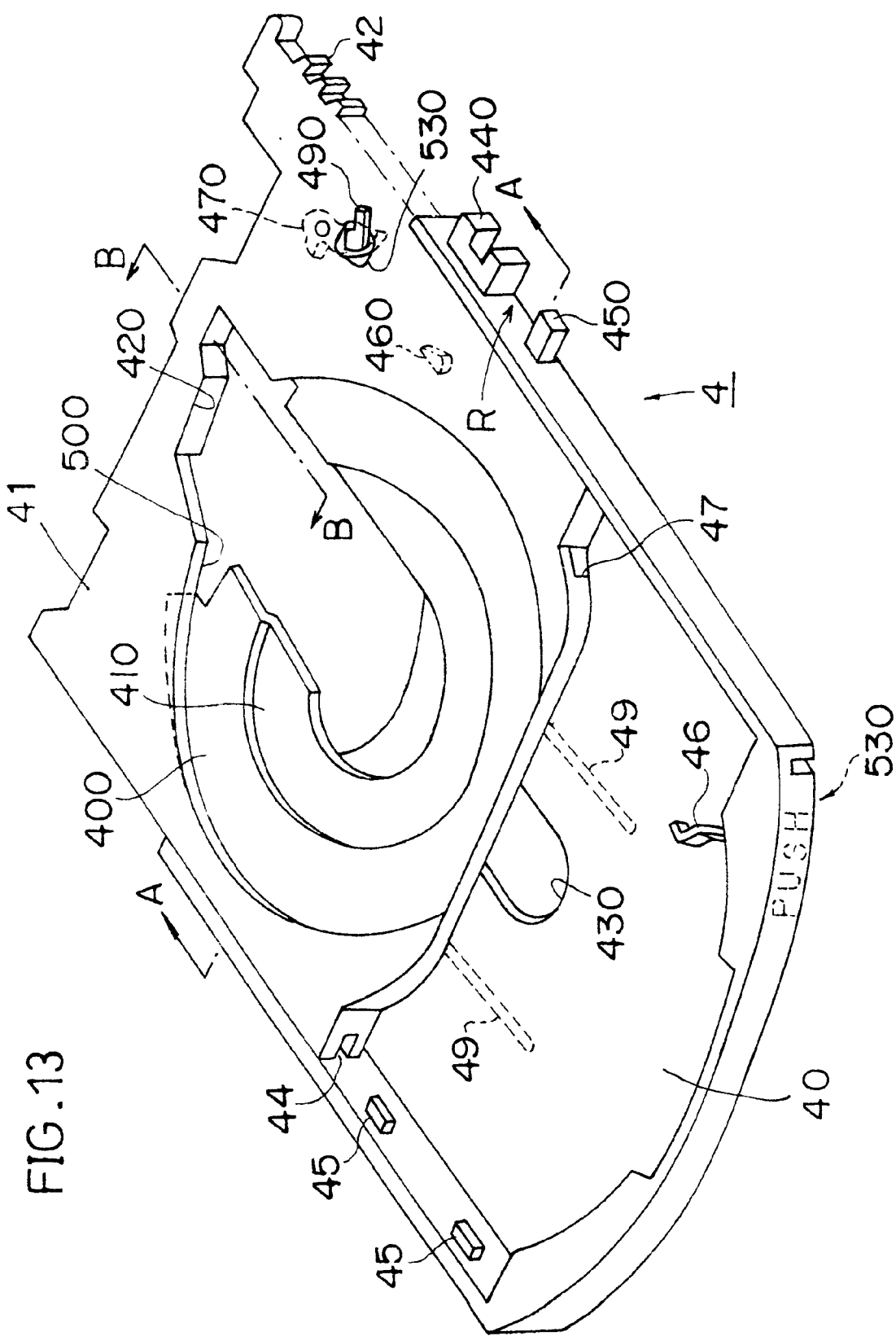
FIG. 13 is an exploded perspective view of the main tray and the subtray.

FIG. 11 is a plan view of the tray 4, and FIG. 13 is a perspective view of the tray 4. The subtray 41 is mounted on the main tray 40 and slidable forward and rearward. As will be described later, the main tray 40 as accommodated in the stacker 7 is slidable only in the ejecting direction. The subtray 41 is guided for sliding by a ridge 45 inwardly projecting from a side wall of the main tray 40 and fitting in a groove 44 formed in the corresponding side face of the subtray 41. A plate spring 46 projecting inward from a rear end portion of the main train 40 fits in a bore 47 in the subtray 41, whereby the subtray 41 is lightly engaged with the main tray 40.

Figure 12:
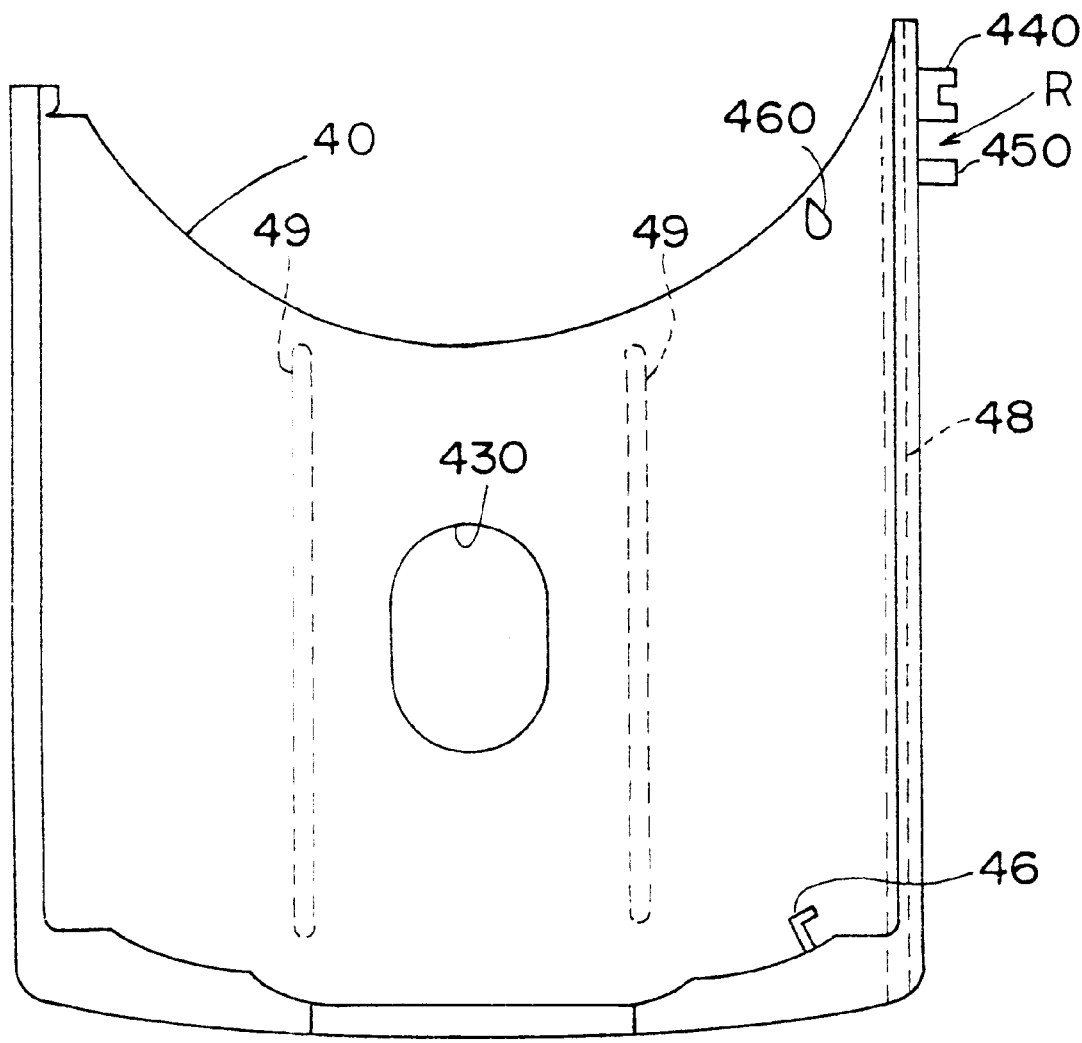
FIG. 12 is a plan view of the main tray.

The subtray 41 is formed at a right side portion with a rack 42 meshing with the drive gear 26 of the unit 2. The rack 42 has at an intermediate portion thereof a large tooth 43 (see FIG. 11) fittable in the cutout 26a of the drive gear 26. During the rotation of the drive gear 26, the large tooth 43 fits into the cutout 26a of the drive gear 26. This eliminates the likelihood of the rack 42 breaking even if the tray 4 is subjected to a great sliding load, with the tooth in the fitting position. With reference to FIG. 12 which is a plan view of the main tray 40, a groove 48 is formed in the bottom surface of the main tray 40 along its right side edge. A ridge 72 (see FIG. 23) on the upper face of the guide plate 71 to be described below fits in the groove 48 to guide the sliding movement of the main tray 40 in the ejecting direction.

Figure 21:
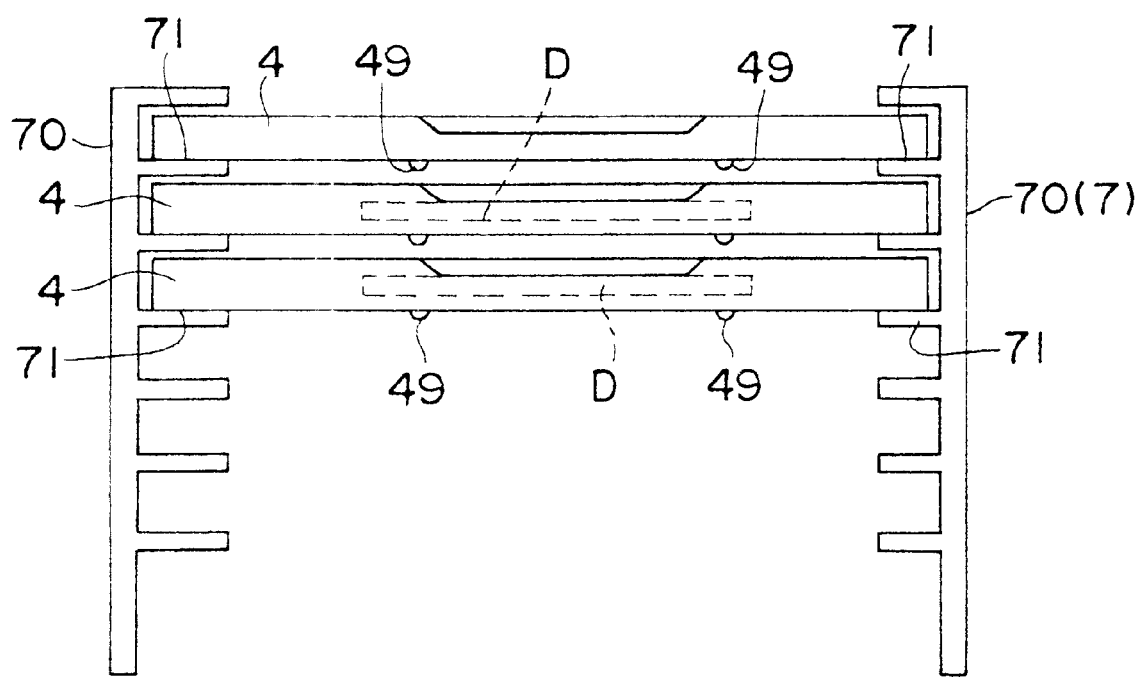
FIG. 21 is a rear view of a stacker.

As shown in FIG. 13, the subtray 41 has a large recessed portion 400 for the large disk to fit in, and a small recessed portion 410 formed at a lower level than the portion 400 for the small disk to fit in. A window 420 for passing a beam from the pickup 260 therethrough is formed in both the large and small recessed portions 400, 410. The main tray 40 has an opening 430 in lapping relation with the window 420. At opposite sides of the opening 430, the main tray 40 has ribs 49, 49 projecting downward and to be opposed to a small disk on another tray 4 in the next lower stage. With these trays 4 entirely stowed in the stacker 4, the ribs 49, 49 are opposed to outer peripheral portions of the small disk D as placed on the lower tray 4 as shown in FIG. 21 so as to prevent the disk D from slipping out.

Thus, in the event of an impact acting on the device, the ribs 49, 49 prevent the small disk D from slipping out of the tray 4. The top of the stacker 7 is covered with a cabinet (not shown), the rear surface of which prevents the disk in the uppermost tray 4 from slipping out.

With reference to FIG. 12, the main tray 40 has an engaging claw 440 and a lug 450 projecting outward from its right side wall. The tray 4 in its closed position as accommodated in the stacker 7 is prevented by the claw 440 from inadvertently sliding longitudinally of the tray as will be described later. The tray sliding mechanism 3 engages in a space R between the lug 450 and the engaging claw 440.

Lock for Main Tray and Subtray

Figure 15:
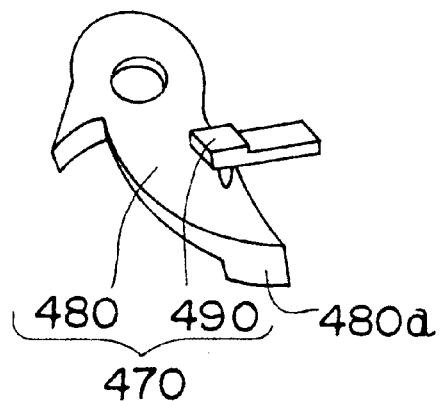
FIG. 15 is a perspective view of a latch lever.

A catch piece 460 is provided on the main tray 40 inwardly of the lug 450. A latch lever 470 is pivoted at one end thereof to the subtray 41 at a location corresponding to the catch piece 460 as seen in FIG. 11. With reference to FIGS. 15 and 18, the latch lever 470 comprises a rotatable member 480 in contact with the lower surface of the subtray 41, and an operating member 490 joined to the member 480, extending through a hole 540 in the subtray 41 and in contact with the upper surface of the subtray 41. The rotatable member 480 is provided at a free end thereof with a downward protrusion 480a and engageable with the catch piece 460.

FIG. 16 includes plan views showing the positional relationship between the subtray 41 and the main tray 40 when the tray 4 is in its closed, (a) showing the position of the latch lever 470 and a cam portion 73 relative to each other, (b) showing the position of the latch lever and the catch piece 460 relative to each other.

With reference to FIG. 16, (a), the latch lever 470 is biased counterclockwise by a torsion spring 495 provided on the rear side of the subtray 41. The cam portion 73 is provided by the inner end face of the guide plate 71 of the stacker 7. The cam portion 73 comprises a first straight part 73a extending in the direction of sliding of the tray 4, a slanting part 73b extending from the rear end of the first straight part 73a and inclined inward, and a second straight part 73c extending from the rear end of the slanting part 73b in parallel to the first straight part 73a. When the tray 4 is in its closed position, the operating member 490 of the latch lever 470 is away from the first straight part 73a.

As shown in FIG. 16, (b), the protrusion 480a of the latch lever 470 is at this time out of engagement with the catch piece 460 on the main tray 40, rendering the subtray 41 slidable in the loading direction away from the main tray 40.

When the main tray 40 moves from the closed position toward the ejected position, the subtray 41 also moves with the main tray 40 since the subtray 41 is lightly held to the tray 40 by the spring 46.

With reference to FIG. 17, (a), the outer end of the operating member 490 comes into contact with the second straight part 73c of the cam portion 73, rotating the latch lever 470 clockwise against the torsion spring 495. As shown in FIG. 17, (b), the protrusion 480a of the latch lever 470 comes into contact with the catch piece 460. When the main tray 40 slidingly moves further rearward, the catch piece 460 pushes the latch lever 470, moving the subtray 41 also rearward. The main tray 40 and the subtray 41 move together rearward.

With the tray 4 in the ejected position, the subtray 41 is not slidable singly forward or rearward. In the closed position, the subtray 41 is movable away from the main tray 40 toward the recording-playback unit 2.

Figure 14:
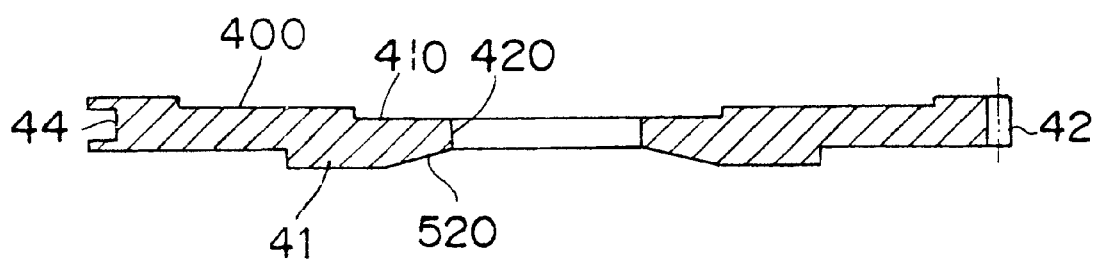
FIG. 14 is a view showing the subtray in section taken along the line A—A in FIG. 13.

The subtray 41 and the main tray 40 are both made of synthetic resin. Experience has shown that the subtray 41 and the main tray 40 are liable to deflect at their central portions to bulge downward after molding. If deflecting greatly, the subtray 41 especially contacts the main tray 40, possibly failing to smoothly slide on the main tray 40. With reference to FIG. 14 showing the subtray 41 in section taken along the line A—A in FIG. 13, the subtray 41 is formed at its central portion with a tapered face 520 inclined inwardly upward to obviate the contact of the subtray 41 with the upper surface of the main tray 40.

Preventing 8-cm Disk from Slipping Off

FIG. 19 is a view in section taken along the line B—B in FIG. 13 and showing the subtray 41. A slipping-off preventing piece 500 integral with the subtray 41 is formed at a front portion of the window 420 to lap over a front end portion of the large recessed portion 400, with a space slightly larger than the thickness of the disk provided therebetween. A downwardly projecting contact wall 510 is positioned forwardly of the piece 500.

The small disk, when placed in the small recessed portion 410 of the tray 4, is prevented from slipping. out by the ribs 49, 49 on the rear side of the overlying main tray 40 as previously stated (see FIG. 21). However, if the device main body is installed as inclined, it is likely that the disk will slide out of the small recessed portion 410 to slip out toward the recording-playback unit 2 through a clearance between the upper surface of the tray 4 and the ribs 49.

The tray 4 of the present embodiment has the slipping-off preventing piece 500 and contact wall 510, so that in the event of the small disk D sliding out toward the recording-playback unit 2, a peripheral portion of the disk D is positioned beneath the piece 500 and impeded by the contact wall 510 as shown in FIG. 19, whereby the small disk D is prevented from slipping out of the subtray 41 toward the unit 2.

Incidentally, the slipping-off preventing piece 500 and contact wall 510 are effective also for preventing the large disk from slipping out toward the unit 2. Additionally, the large disk is precluded from slipping out toward the unit 2 by the inside guide plates 71 having a large width and lapping over the large recessed portion 400 of the tray 4 as shown in FIG. 3 and by the unit 2 which, when the disk is to be ejected, is positioned as opposed to the tray 4 having the disk thereon.

Holding Tray to Stacker

Figure 20A:
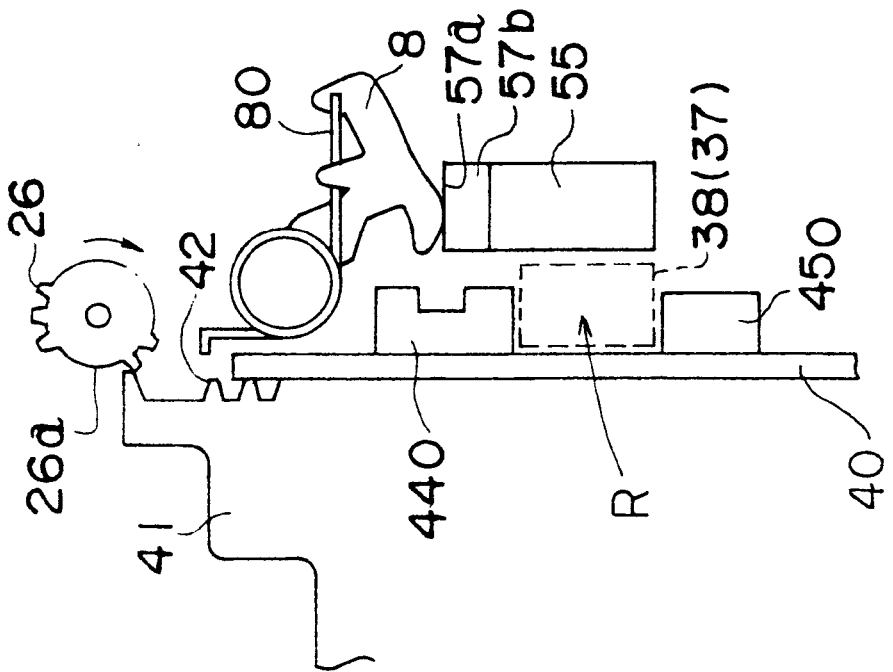
FIG. 20 includes plan views showing the positional relationship between a pawl and an engaging claw, (a) showing the pawl engaging in the claw, (b) showing the claw as released from the pawl.
Figure 20B:
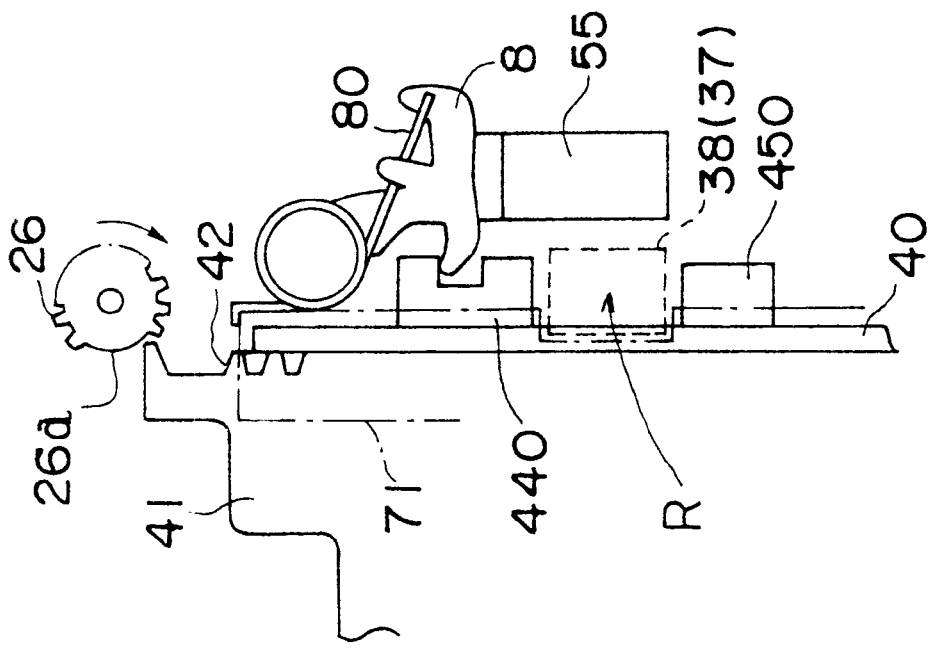

FIG. 20, (a) and (b) are plan views of the front end portion of the tray 4 at the right side thereof. When the tray 4 is in the closed position, the front end of the rack 42 on the subtray 41 is in contact with the cutout portion 26a of the drive gear 26 of the unit 2. The subtray 41 in the closed position is slidingly moved toward the unit 2 by the clockwise rotation of the drive gear 26.

Unless the tray 4 in the closed position is held to the stacker 7, there is a likelihood of the tray 4 slipping off outward if the device main body is installed as inclined. The holding mechanism to be described below is therefore provided for preventing the tray 4 in the closed position from slipping out toward the ejected position.

Figure 23:
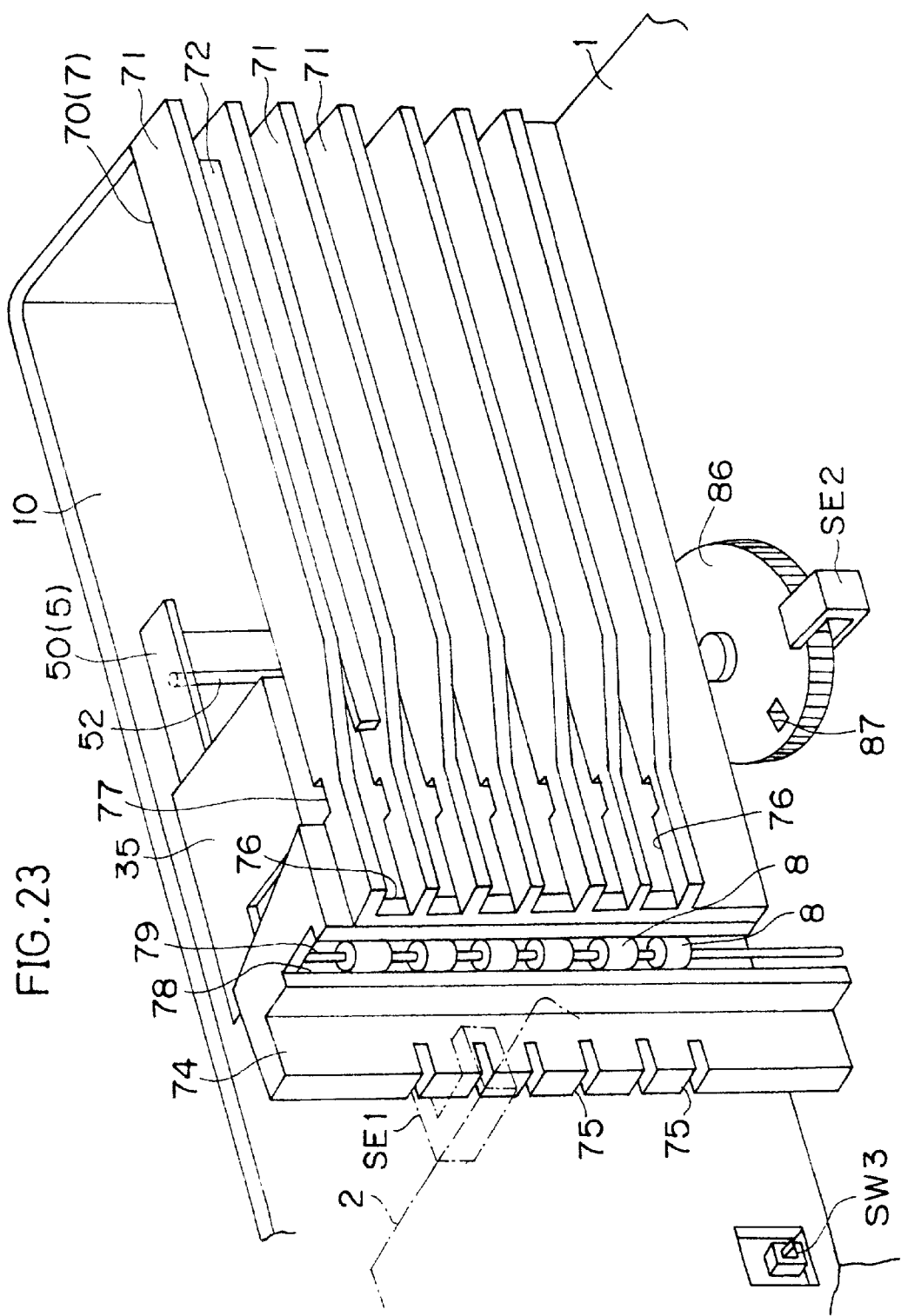
FIG. 23 is a perspective view of a stacker piece at right.
Figure 26:
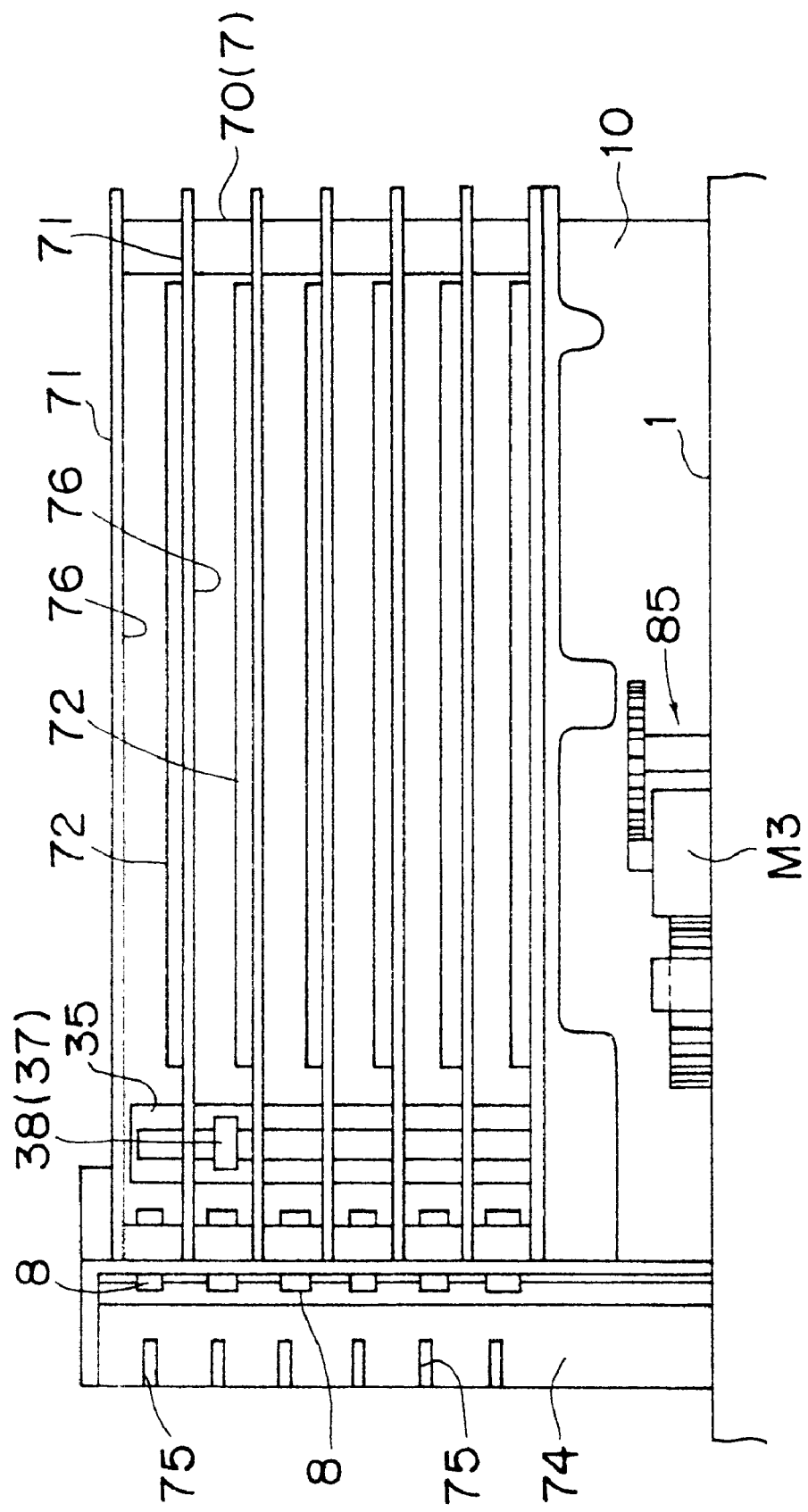
FIG. 26 is a side elevation of the stacker piece of FIG. 23.

FIG. 23 is a perspective view of the stacker piece 70 at right as it is viewed obliquely from the front, and FIG. 26 is a side elevation of the stacker piece 70 as it is seen from inside. As already described, the stacker piece 70 is provided with the guide plates 71 arranged one above another, and each guide plate 71 has the ridge 72 fitting in the groove 48 of the main tray 40. FIG. 23 shows the ridge 72 in the first stage only.

A vertical plate 74 integral with the stacker piece 70 is positioned forwardly of the guide plates 71. Formed in the vertical plate 74 are slits 75 corresponding to the guide plates 71 and equal in number to the number of trays 4. The aforementioned sensor SE1 provided on the unit 2 is fitted to the plate 74 upwardly or downwardly movably. With the ascent or descent of the unit 2, the senor SE1 detects a particular slit 75, indicating the level at which the unit 2 is positioned. This makes it possible to stop the unit 2 at a specified level accurately.

When positioned at the lowermost level, the recording-playback unit 2 presses a complete descent detecting switch SW3 on the side plate 10. This switch SW3 is included in the above-mentioned motor unit 9 (see FIG. 2).

With reference to FIG. 23, formed between the vertical plate 74 and the guide plate 71 is a furrow 78, in which an upstanding rod 79 is disposed. Pawls 8 are fittingly mounted on the rod 79 at the same spacing as the trays 4. An elongated aperture 76 extending in the direction of sliding movement of the tray is formed between each pair of vertically adjacent guide plates 71. The paw 1 8 has a free end projecting inward through the elongated aperture 76.

With reference to FIG. 20, (a), the pawl 8 is biased clockwise by a torsion spring 80, with its free end engaged in the claw 440. The guide plate 71 is indicated in a chain line in this drawing. In this state, the main tray 40 is restrained from sliding forward or rearward. Since the subtray 41 is releasable from the main tray 40 in the closed position as previously described, the drive gear 26, when rotated, slidingly advances the subtray 41 only toward the recording-playback unit 2.

When the pawl 8 rotates counterclockwise against the torsion spring 80, disengaging the free end of the pawl 8 from the claw 440 as shown in FIG. 20, (b), the main tray 40 becomes slidable toward the ejected position along with the subtray 41 as already described. The pawl 8 is rotated counterclockwise by the coupling unit 5 for coupling the tray sliding mechanism 3 to the tray 4 as will be described below.

Tray Sliding Mechanism and Coupling Unit

The tray sliding mechanism 3 is coupled to the tray 4 by the coupling unit 5. The tray sliding mechanism 3 will be described first.

Figure 24:
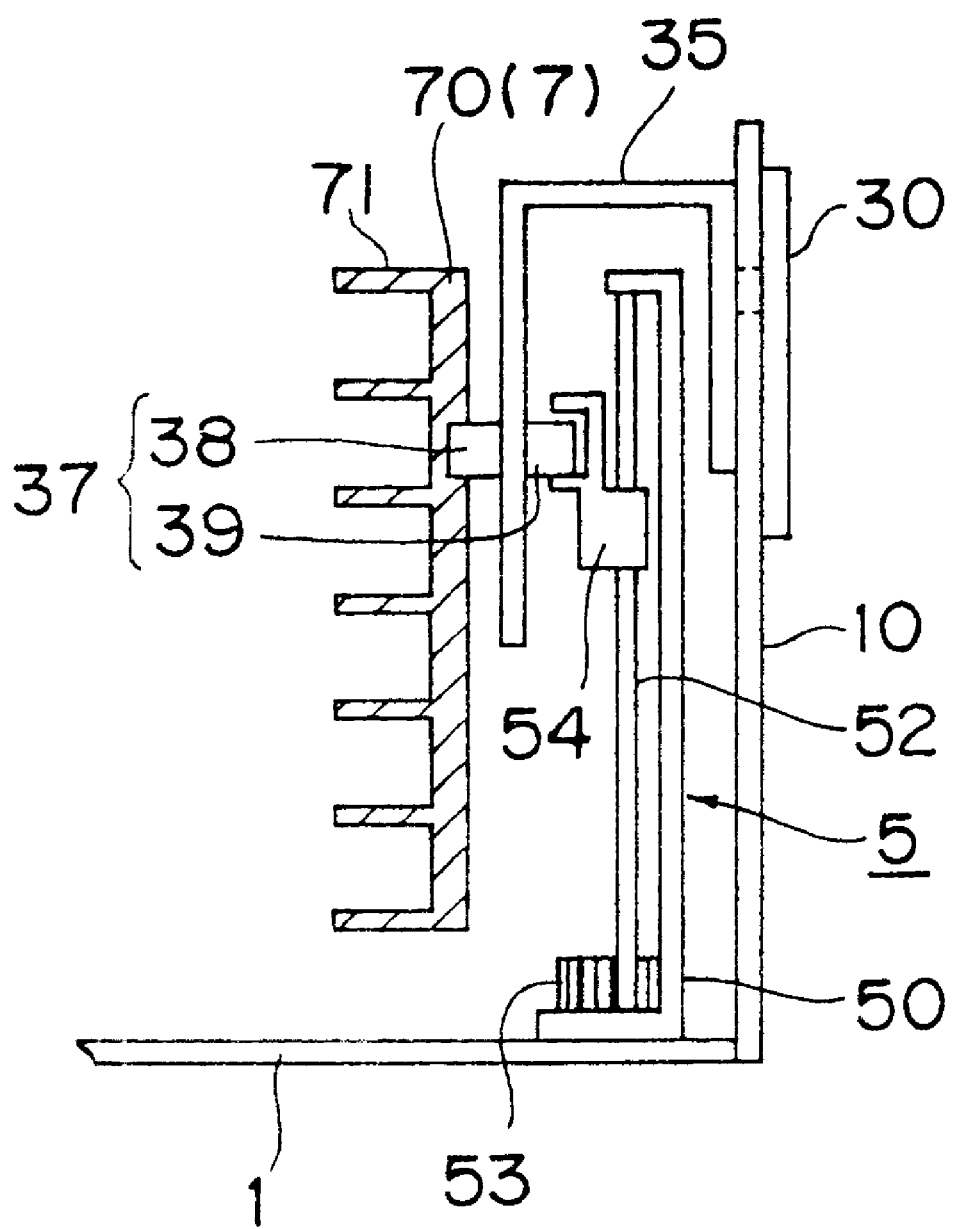
FIG. 24 is a side elevation of the coupling unit with the stacker piece partly broken away.
Figure 25:
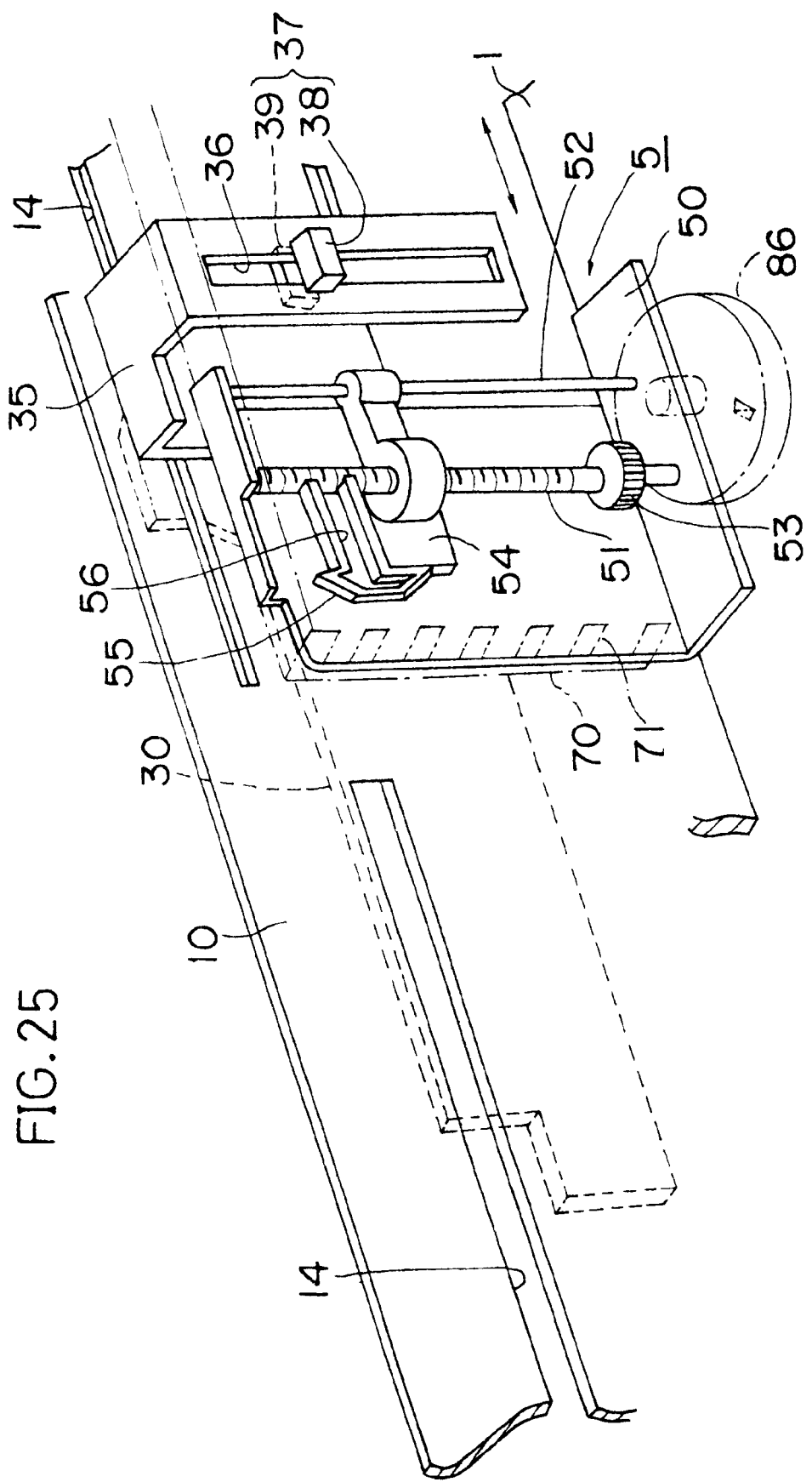
FIG. 25 is a perspective view of the coupling unit.

FIG. 24 is a sectional view of the right side plate 10 as it is viewed from the ejected position, and FIG. 25 is a perspective view of the same side plate 10 as it is viewed from inside and the front. The tray sliding mechanism 3 has the opening-closing slide 30, one end portion of which extends through the side plate 10 and has a slidable bracket 35 attached thereto. The bracket 35 is formed by bending a metal plate, and has an open end facing down and a wall facing the side wall of the stacker 7 and formed with a vertical aperture 36.

The aperture 36 has fitted therein a slider 37 which is movable upward and downward. The slider 37 comprises two pieces positioned at opposite sides of the aperture 36 and joined together, i.e., a tray coupling piece 38 adjacent the stacker 7 and a fitting piece 39 adjacent the slide plate 10. When the opening-closing slide 30 moves forward or rearward, the slidable bracket 35 and the slider 37 also move forward or rearward.

As previously stated, the slide 30 is slidable forward and rearward by the motor unit 9. FIG. 29, (a) and (b) are side elevations of the opening-closing slide 30 as it is seen from outside, (a) showing the closed position, (b) showing the ejected position. The motor unit 9 has mounted on a mount plate 90 the motor M1 and a gear train 92 coupled to the motor M1 by a belt 91. Attached to the mount plate 90 are a closed position detecting switch SW2 corresponding to the terminal of path of travel of the slide 30, an ejected position detecting switch SW1 and the aforementioned switch SW3 for detecting complete descent of the unit 2.

The opening-closing slide 30 has a bottom edge providing a rack 32, and a lock gear 31 rotatably mounted on a rear end portion thereof and formed with a toothed face positionable in alignment with the rack 32. The lock gear 31 is biased clockwise by a torsion spring (not shown). In the ejected position of FIG. 29, (b), the gear 31 bears on a stopper 33 projecting from the slide 30.

In the ejected position shown in FIG. 29, (b), the slide 30 is in pressing contact with the switch SW1, indicating that the ejected position is reached. When energized in this state, the motor M1 moves the slide 30 forward by way of the gear train 92. When a gear 93 at the downstream end of the gear train 92 comes into meshing engagement with the lock gear 31 as shown in FIG. 30, (a), the lock gear 31 rotates counterclockwise, moving out of contact with the stopper 33.

Figure 30A:
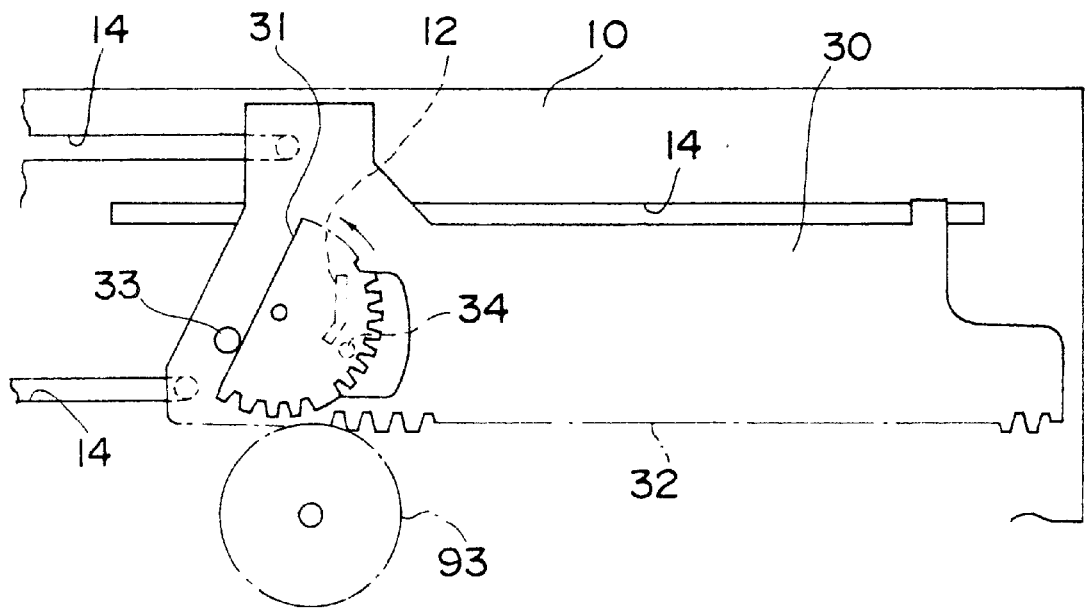
FIG. 30 includes enlarged fragmentary views of FIG. 29, (a) showing a lock gear immediately before locking, (b) showing the slide as locked by the gear.
Figure 30B:
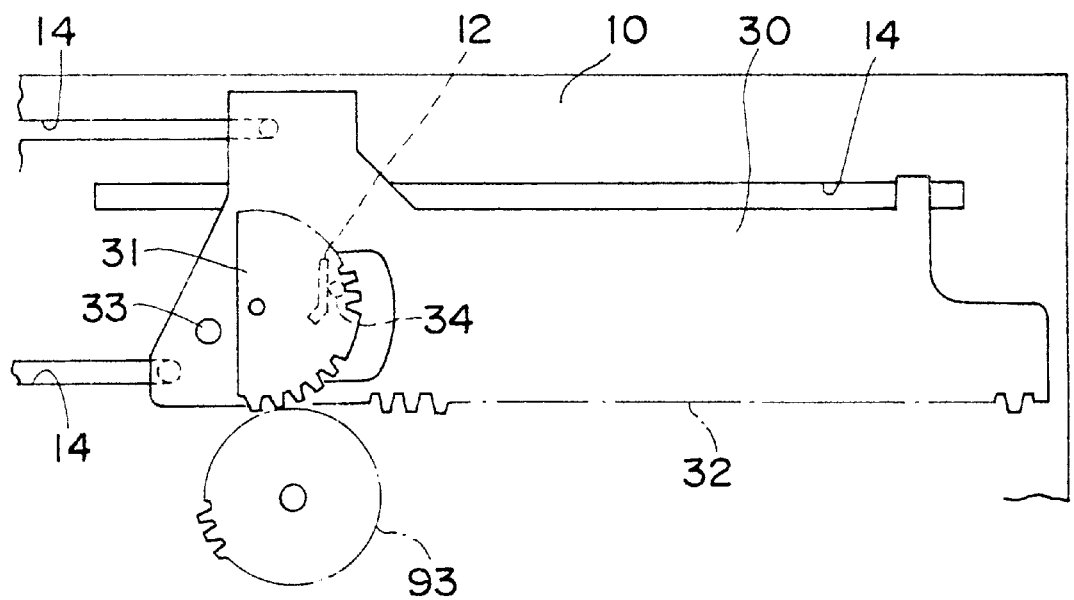

FIG. 30, (a) and (b) are enlarged views of the lock gear 31 and the vicinity thereof. As indicated in broken lines in these drawings (a) and (b), the side plate 10 has an engagement piece 12 projecting outward therefrom, and the lock gear 31 has a projection 34 extending inward therefrom. The counterclockwise rotation of the gear 31 brings the projection 34 into contact with the engagement piece 12, whereby the slide 30 is prevented from rearward backlashing. The slide 30 presses the closed position detecting switch SW2, whereupon the slide stops. In this state, the slide 30 is in the closed position.

Figure 27:
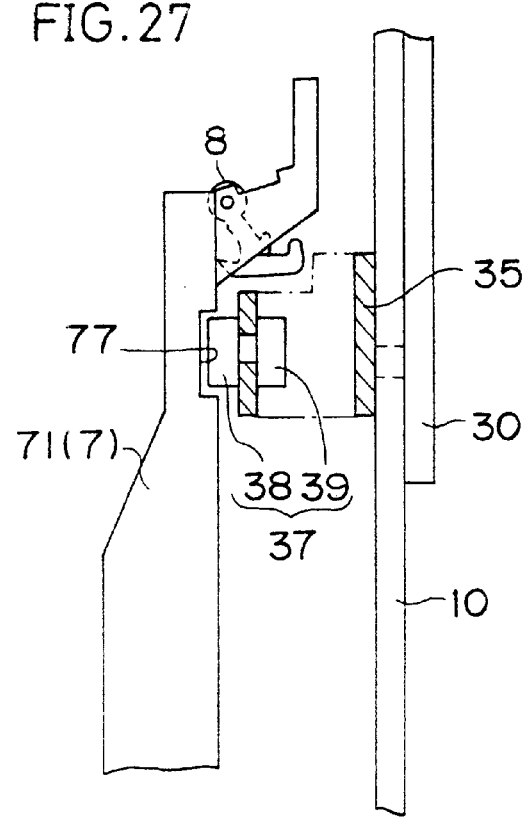
FIG. 27 is an enlarged plan view of a slider as fitted in a cutout.

FIG. 27 is a plan view showing the positional relationship between the guide plate 71 of the stacker 7 and the slider 37 in the closed position. FIG. 20, (a) shows the position of the slider 37 and the lug 450 relative to each other. The guide plate 71 has a cutout 77 for permitting the slider 37 to move upward or downward therethrough. In the closed position, the slider 37 moves up or down along the vertical aperture 36 (see FIG. 26). The slider 37 fits into the space R between the lug 450 and the engaging claw 440. When the slidable bracket 35 moves with the slide 30 toward the ejected position, the tray 4 also moves toward the ejected position by being pushed by the slider 37 [see FIG. 31, (b)].

The coupling unit 5 serves to move the slider 37 upward or downward, hold the slider thus moved and engage the slider 37 with the tray 4. The unit will be described below more specifically.

Figure 22:
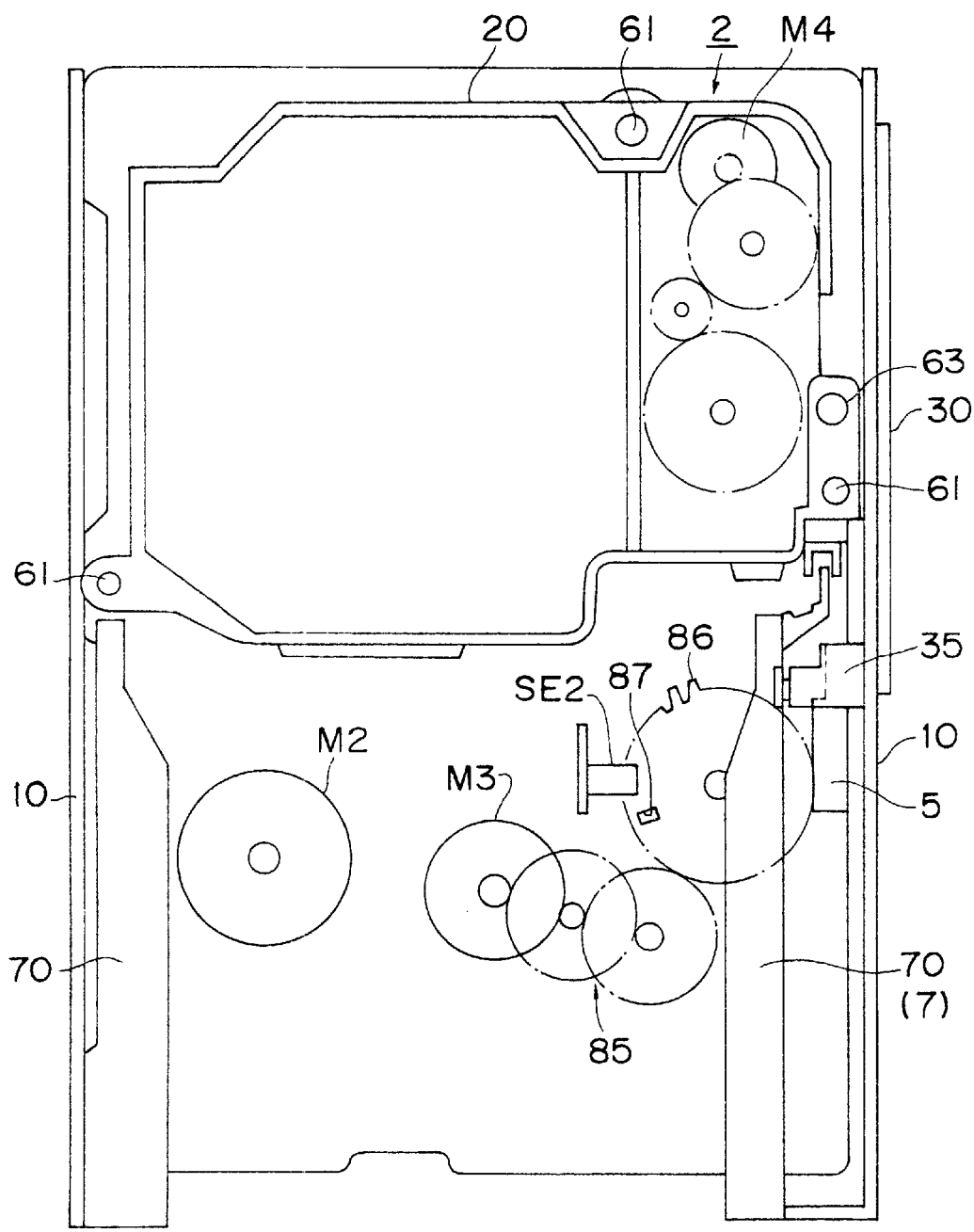
FIG. 22 is a plan view showing the positional relationship between a motor for operating a coupling unit and a train of gears.

FIG. 22 is a plan view showing the position of the coupling unit 5 relative to the chassis 1. The motor M3 mounted on the chassis 1 is operatively connected to the coupling unit 5 via a gear train 85. A gear 86 positioned at the downstream end of the gear train 85 is located under the stacker 7 (see FIG. 26) and has a hole 87 close to its outer periphery. A sensor SE2 is mounted on the chassis 1 for detecting the hole 87. When the sensor SE2 detects the hole 87 first and thereafter detects the hole 87 again, this indicates one turn of rotation of the gear 86. One turn of rotation of the gear 86 corresponds to the distance a lift member 54 and the slider 37 move upward or downward by one stage of the guide plate 71.

With reference to FIG. 25, the coupling unit 5 has a holding bracket 50 provided inside the slidable bracket 35. As shown in FIG. 24, the holding bracket 50 is secured to the chassis 1. The bracket 50 is provided with an upstanding worm 51 and a guide rod 52 arranged in parallel. A gear 53 of synthetic resin is fitted around the worm 51 and meshes with the gear 86 on the chassis 1.

The lift member 54, which is made of synthetic resin, is fitted to both the worm 51 and the guide rod 52. The rotation of the motor M3 is transmitted via the gear train 85 to the worm 51, rotating the worm 51, which in turn moves the lift member 54 upward or downward along the guide rod 52.

Figure 28:
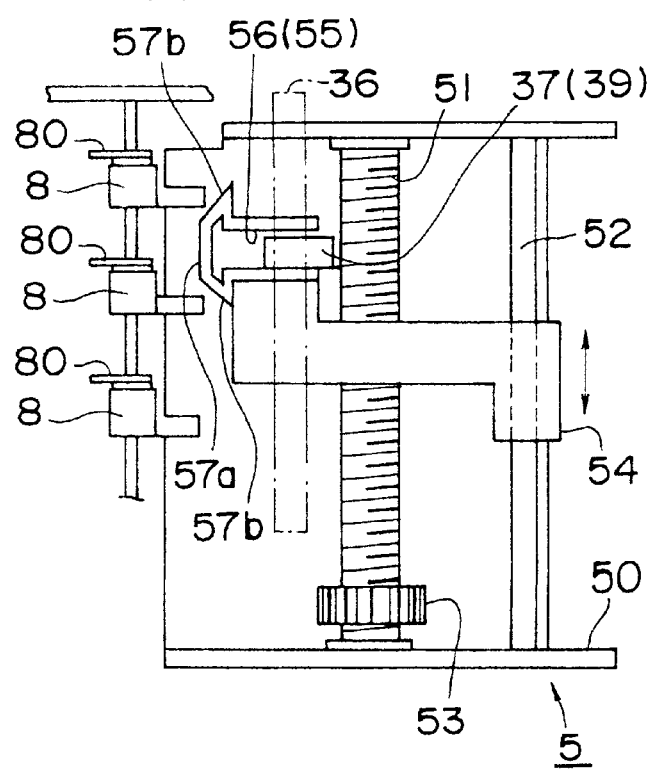
FIG. 28 is a side elevation showing a holding bracket as it is seen from inside, with the slider fitting in a lift member.

FIG. 28 is a front view of the holding bracket 50.

The lift member 54 is provided at its front end with an unlocking piece 55, which is internally formed with a guide groove 56 for fitting the fitting piece 39 of the slider 37 therein. The front end of the unlocking piece 55 has a vertical face 57a adapted to contact the pawl 8, an d tapered faces 57b, 57b obliquely extending respectively from the upper and lower ends of the vertical face 57a. The center of the vertical face 57a with respect to the direction of its height and the center of the guide groove 56 with respect to the direction of its height are positioned on the same horizontal plane.

As seen in FIG. 28, the fitting piece 39 of the slider 37 fits into the guide groove 56, upon the opening-closing slide 30 and the slidable bracket 35 reaching the closed position, i.e., the foremost position. The slider 37 in the closed position is vertically movable without being interfered with by the guide plates 71 (see FIG. 27), so that the worm 51, when rotated, moves the lift member 54 and the slider 37 together upward or downward.

The tapered face 57b and the vertical face 57a of the lift member 54 come into contact with the pawl 8, disengaging the pawl 8 from the main tray 40 as will be described below.

Upon the tapered face 57b of the lift member 54 coming into contact with the pawl 8, the pawl 8 rotates against the force of the torsion spring 80 to move out of engagement with the claw 440 as shown in FIG. 20, (b) since the pawl 8 is restrained from moving upward or downward. When the vertical face 57a of the lift member 54 comes into contact with the free end of the pawl 8, the pawl 8 is completely disengaged, rendering the tray 4 slidable toward the ejected position.

As previously stated, the center of the vertical face 57a of the lift member 54 and the center of the guide groove 56 are positioned on the same horizontal plane, while the pawl 8 is positioned at the same level as the corresponding elongated aperture 76 as seen in FIG. 26. With the pawl 8 completely disengaged, therefore, the tray coupling piece 38 of the slider 37 enters the aperture 76.

FIG. 31, (a) and FIG. 31, (b) show the positional relationship between the lift member 54, tray 4 and slider 37 in the closed position-and in the ejected position, respectively. As seen in FIG. 31, (a), the tray coupling piece 38 fits to the corresponding tray 4. With the fitting piece 39 engaged in the guide groove 56 of the lift member 54, there is no likelihood of the slider 37 falling.

The movement of the opening-closing slide 30 from the closed position toward the ejecting direction also moves the slidable bracket 35 therewith, so that the slider 37 positioned as fitted in the cutout 77 of the guide plate 71 slidingly moves rearward, permitting the tray coupling piece 38 to slide on the guide plate 71. The slider 37 moves out of the guide groove 56 of the lift member 54, slidingly moving the tray 4 toward the ejecting direction as shown in FIG. 31, (b).

Figure 36:
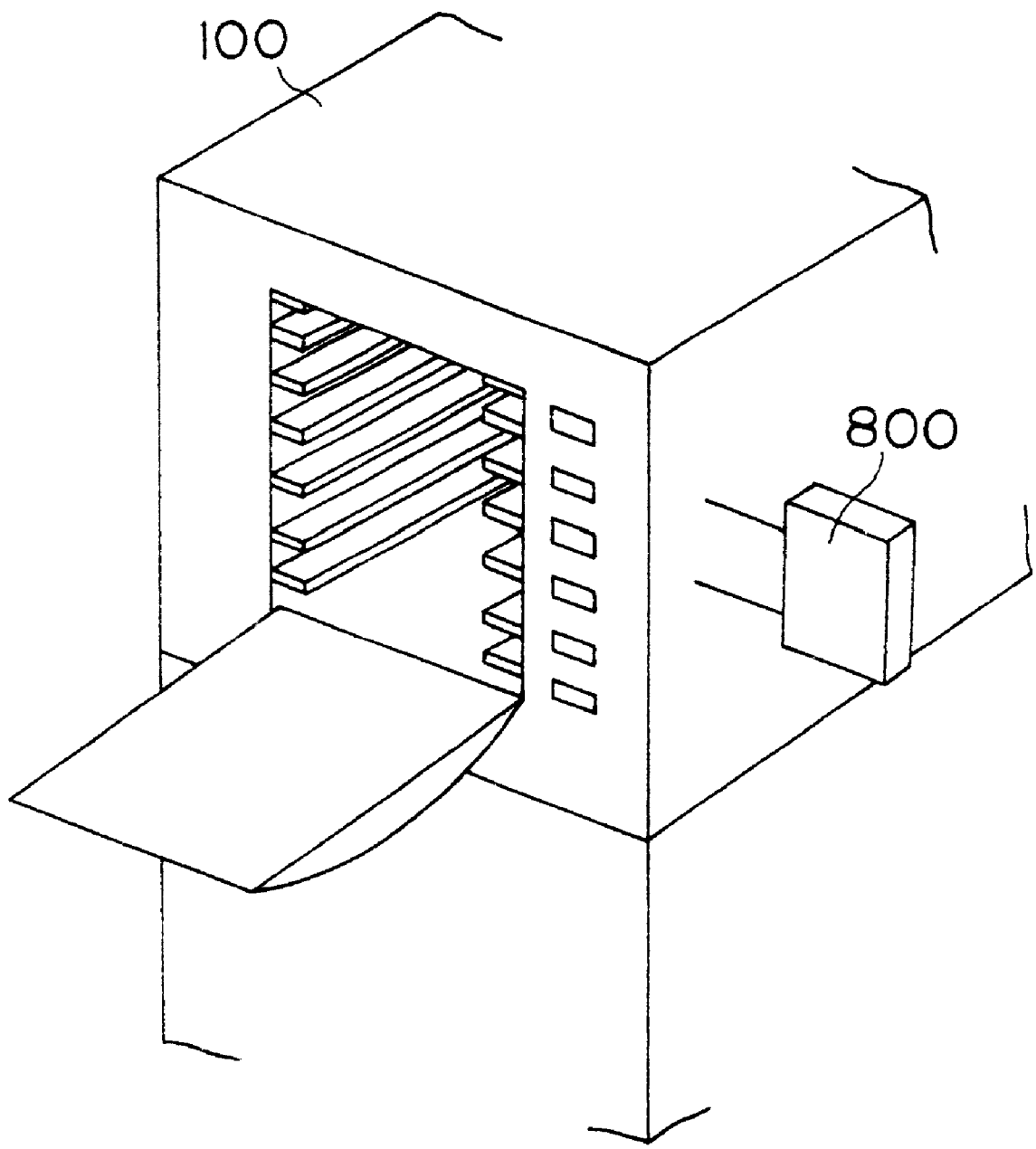
FIG. 36 is a perspective view of the main body of the device.

FIG. 36 is a perspective view showing the device main body 100 in its entirety. The main body 100 has connected thereto a processor 800 wherein specified operation programs are stored. The motors M1 to M4, sensors SE!, SE2, and switches SW1, SW2, SW3 are connected to the processor 800, which in turn controls the operation of the device.

Disk Stowing Operation

First, the operation button (not shown) on the device main body is pressed in order to cause the tray 4 to be ejected from the stacker 7, place a disk on the tray 4 and accommodate the tray in the stacker 7 again. The motor M1 of the motor unit 9 is driven to move the opening-closing slide 30 forward from the state of FIG. 29, (b) [see FIG. 29, (a)]. The tray 4 fitting to the slider 37 is drawn in, and the slider 37 fits into the guide groove 56 of the lift member 54 as seen in FIG. 31, (a). At this time, the slide 30 presses the closed position detecting switch SW2 as shown in FIG. 29, (a), whereupon the motor M1 stops. The pawl 8 fits to the tray 4 in the closed position as stowed in the stacker 7 as shown in FIG. 20, (a).

Recording-Playback Procedure

Figure 35:
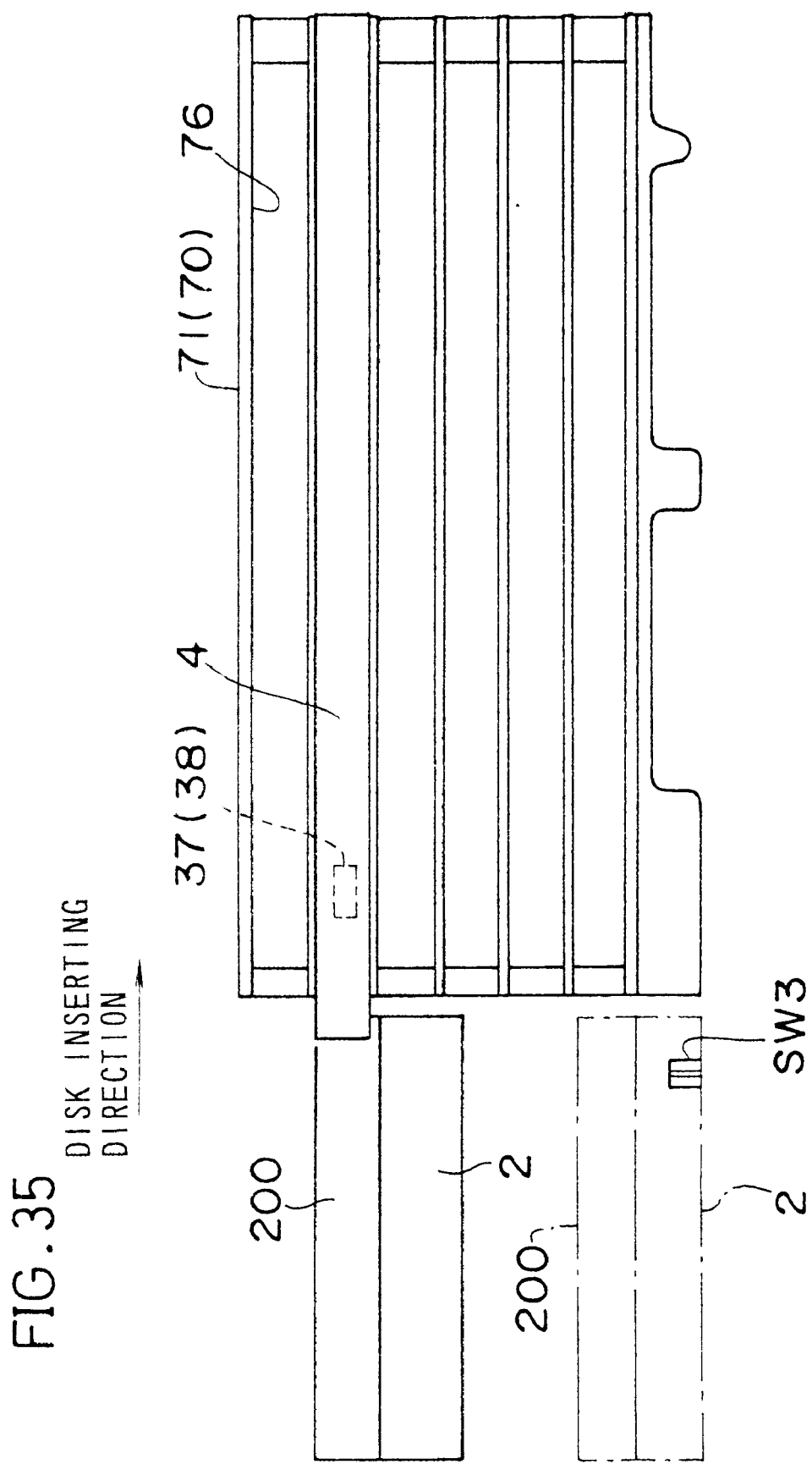
FIG. 35 is a side elevation showing the position of the recording-playback unit relative to a tray when the tray is to be ejected.

As indicated in chain lines in FIG. 35, the recording-playback unit 2 is initially in a standby position at the lowermost level, pressing the complete descent detecting switch SW3.

The number of the tray 4 to be used for recording or playback is input to the device, whereupon the processor 800 energizes the motor M2 shown in FIG. 9 to rotate the annular gear 60. The gear 60 rotates the three worms 61, 61, 61, raising the unit 2. The sensor SE1 on the unit 2 counts the number of slits 75 passed by as seen in FIG. 23, and upon detecting the unit 2 positioned as opposed to the specified tray 4, the processor 800 deenergizes the motor M2.

Figure 32:
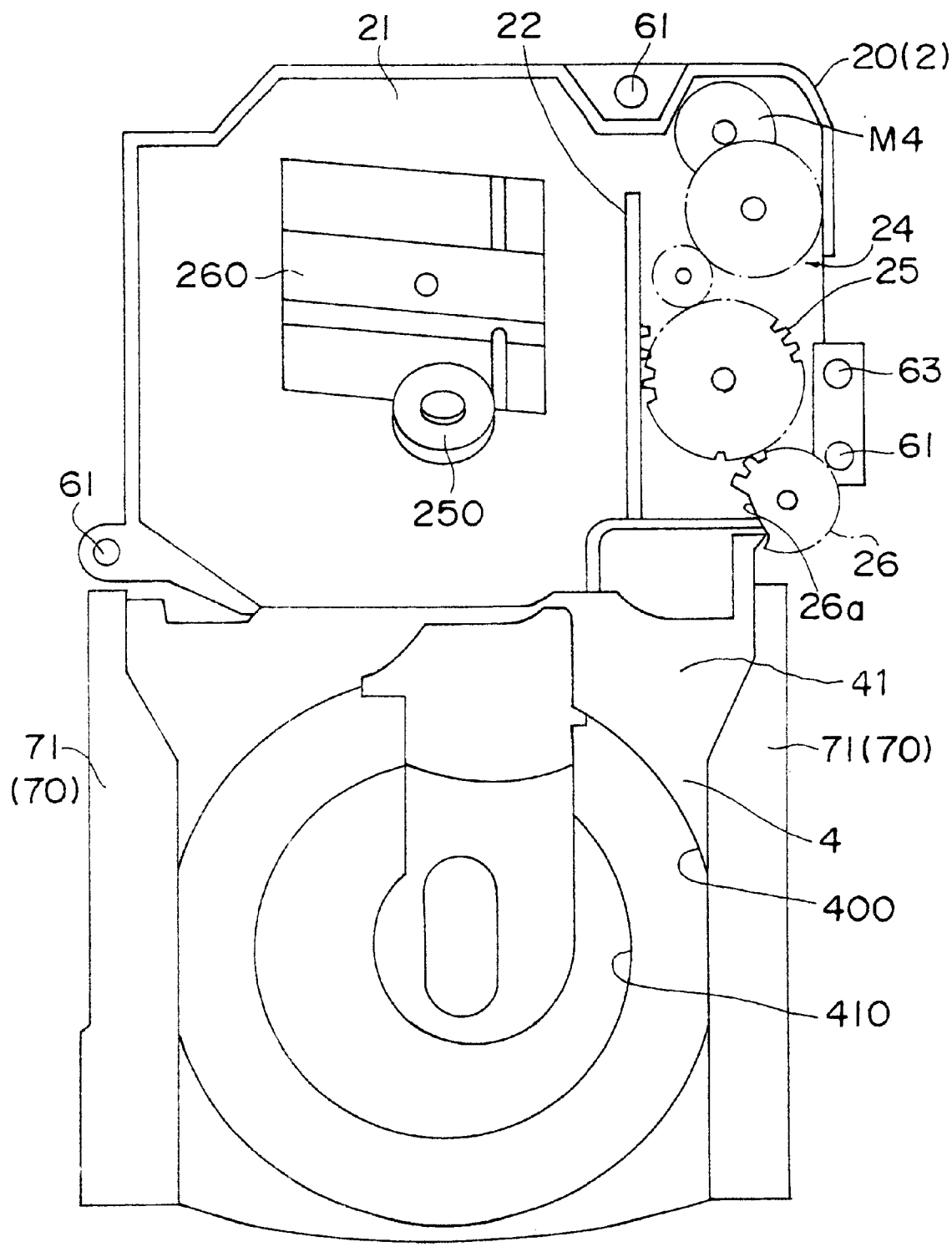
FIG. 32 is a plan view showing the positional relationship between the subtray in the closed position and the recording-playback unit.

In this state, the drive gear 26 is positioned close to the front end of the subtray 41 as shown in FIG. 32. The processor 800 energizes the motor M4 to rotate the drive gear 26 clockwise through the gear train 24 as shown in FIG. 33, (a). In the closed position, the subtray 41 is out of engagement with the main tray 40, which is in turn held by the pawl 8 as previously stated, so that the subtray 41 alone slidingly moves toward the unit 2.

With the movement of the subtray 41, the large tooth 43 of the rack 42 fits into the cutout 26a of the drive gear 26 as shown in FIG. 33, (b). In this fitting position, there is no likelihood of the rack 42 breaking even if the sliding load of the subtray 41 is great.

Figure 34:
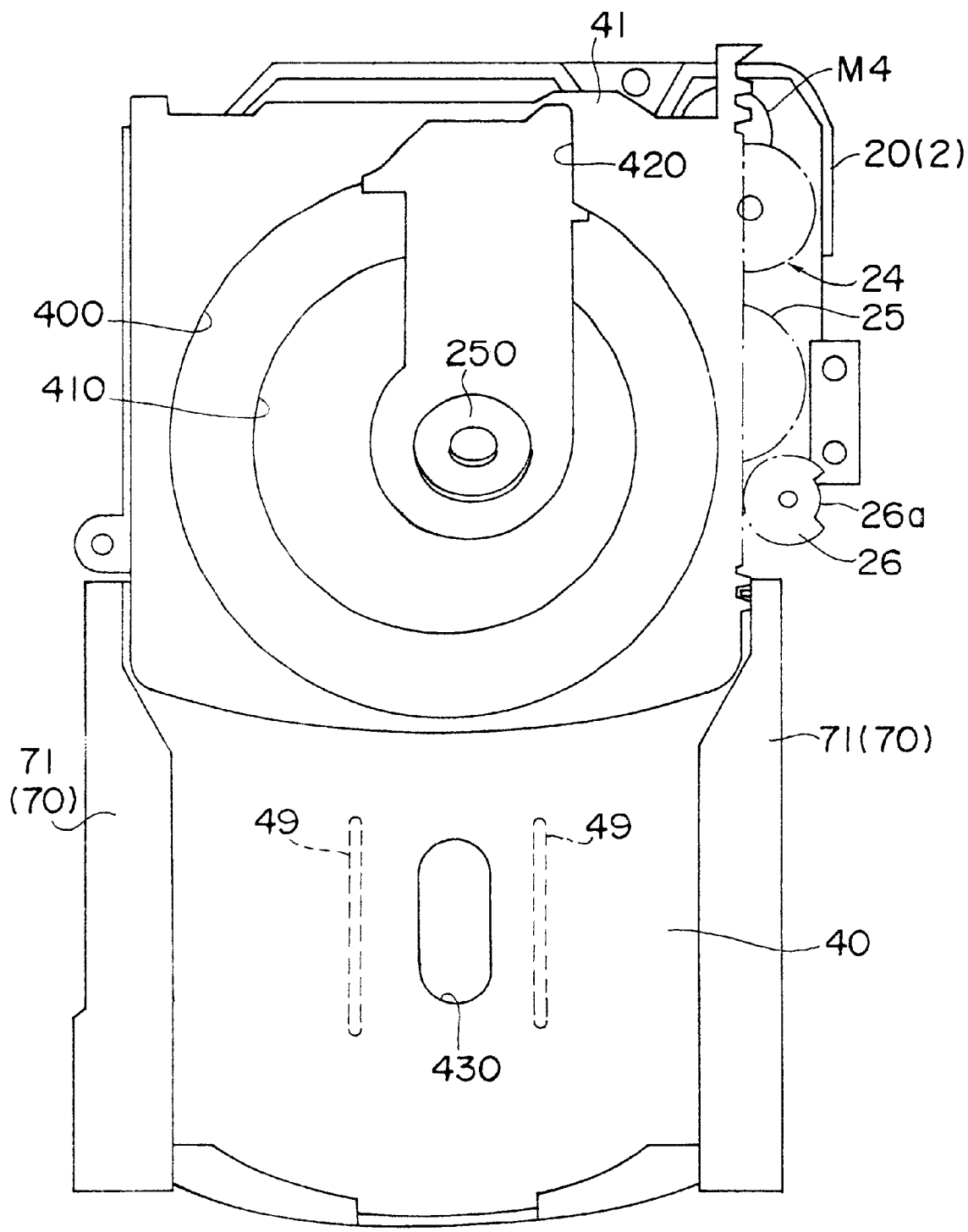
FIG. 34 is a plan view showing the subtray as positioned on the recording-playback unit.

FIG. 34 is a plan view of the subtray 41 as advanced completely. The subtray 41 is positioned over the lift holder 20, and the window 420 of the subtray 41 leaves the turntable 250 exposed. The drive gear 26 and the operating gear 25 providing a Geneva motion are brought out of meshing engagement [see FIG. 41, (a) and (b)]. When the motor M4 on the lift holder 20 further rotates, the operating gear 25 meshes with the operating slide 22 to move the slide 22 slidingly. The movable support 21 pivotally moves upward about the pivot 28 to fit to the clamp 210 as shown in FIG. 5, rendering the disk ready for recording or playback. The turntable 250 rotates, and the pickup 260 projects a beam on the rear surface of the disk for recording or playback.

Tray Ejecting Operation

In the closed position, the slider 37, fitted in the guide groove 56 of the lift member 54, is movable with the member 54 upward or downward as seen in FIG. 28.

When a particular tray 4 within the stacker 7 is to be ejected, the processor 800 energizes the motor M3 (see FIG. 22) to rotate the worm 51 within the holding bracket 50 and move the lift member 54 upward or downward. The sensor SE2 shown in FIG. 22 counts the number of revolutions of the hole 87 in the gear 86 moving past. When the positioning of the lift member 54 and the slider 37 as opposed to the tray 4 to be ejected is detected, the motor M3 is deenergized.

In this position, the main tray 40 is released from the pawl 8 by the unlocking piece 55 as previously stated and shown in FIG. 20, (b), and is slidable with the subtray 41 toward the ejected position. The processor 800 energizes the motor M1 in this state.

The opening-closing slide 30 moves rearward from the position shown in FIG. 31, (a). The slider 37 coupled to the slide 30 by the slidable bracket 35 fits to the main tray 40 and moves toward the ejected position. The main tray 40 moves with the subtray 41 by virtue of the engagement of the catch piece 460 with the latch lever 470 [see FIG. 17, (a) and (b)]. The processor 800 deenergizes the motor M1 upon the slide 30 pressing the ejected position detecting switch SW1.

Preventing Subtray from Falling

When the tray 4 is to be ejected by the above procedure in the present device, the motor M2 is first energized to move the recording-playback unit 2 to a position one stage below the tray 4 to be ejected, and to position the clamp plate 200 on the unit 2 in opposed relation with the front side of the tray 4 to be ejected as seen in FIG. 35. The stacker 7 is positioned some distance above the chassis 1, so that when the tray 4 in the lowermost stage is to be ejected, the unit 2 is brought to the position corresponding to this distance and then presses the complete descent detecting switch SW3. In FIG. 35, the tray 4 to be ejected is in the second stage from above. Given below is the reason why the unit 2 is brought to the position stated above.

When the tray 4 is to be ejected, the main tray 40 is released from the pawl 8, with the result that the main tray 40 and the subtray 41 are made slidable toward the recording-playback unit 2. The main tray 40 is restrained from advancing by the contact of the engaging claw with an end edge of the elongated apertured portion 76 of the stacker piece 70, whereas the subtray 41 is movable forward as it is. If the device main body is installed as inclined, therefore, the subtray 41 moves out of light engagement with the main tray 40, and the subtray 41 to be ejected from the closed position is likely to fall onto the unit 2. With the present device, the clamp plate 300 is positioned as opposed to the front side of the tray 4 to be ejected to obviate the likelihood of the subtray 4 falling toward the unit 2.

Figure 42:
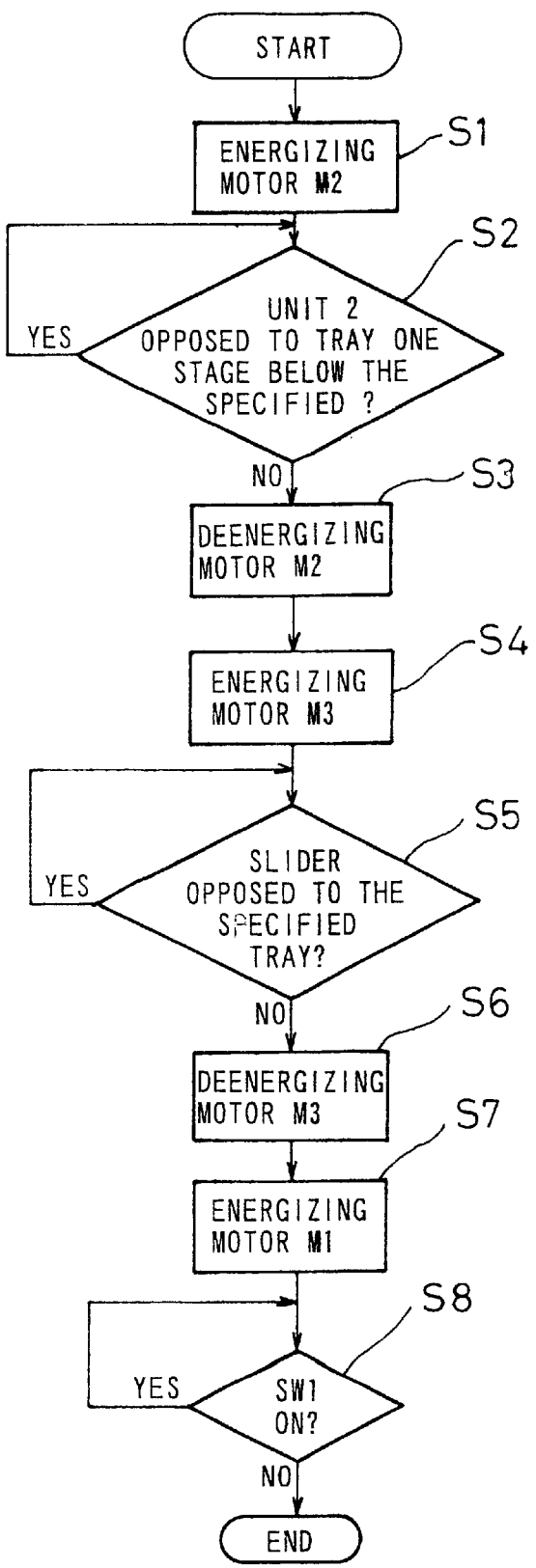
FIG. 42 is a flow chart showing a tray ejecting operation.
Figure 43:
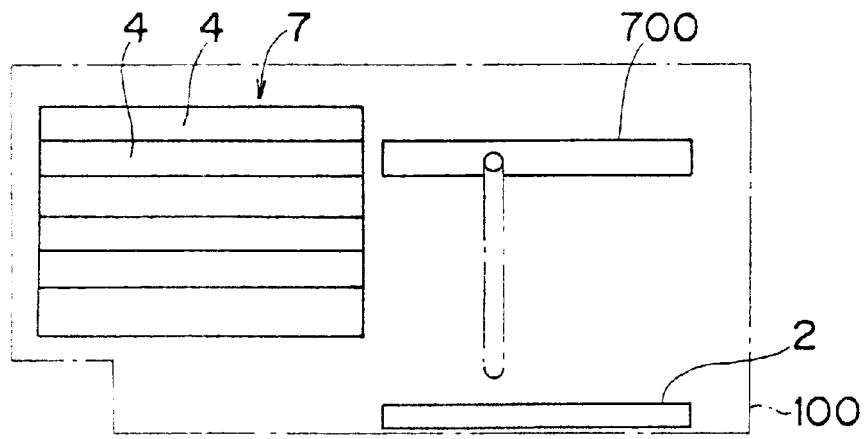
FIG. 43 is a side elevation showing a conventional disk recording-playback device.
Figure 44:
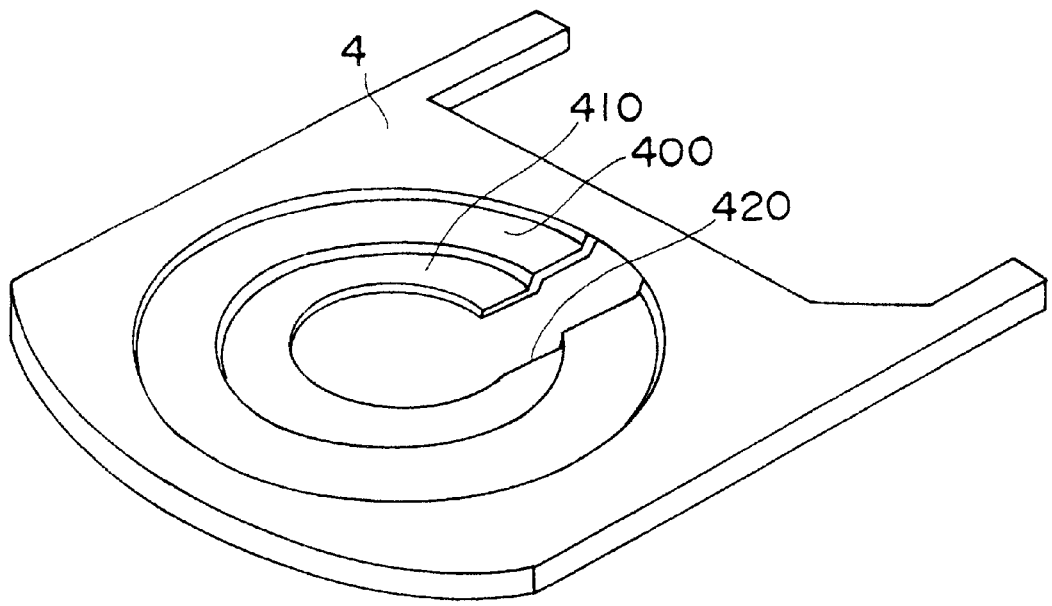
FIG. 44 is a perspective view of a tray of the conventional device.
Figure 45:
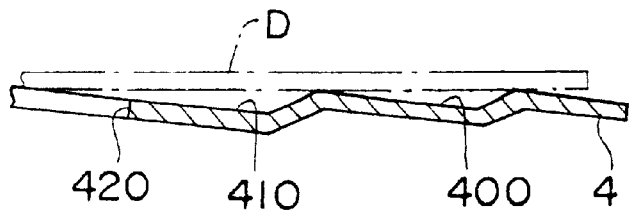
FIG. 45 is a side elevation in section showing how a small disk slips out of the tray toward a recording-playback unit.
Figure 46:
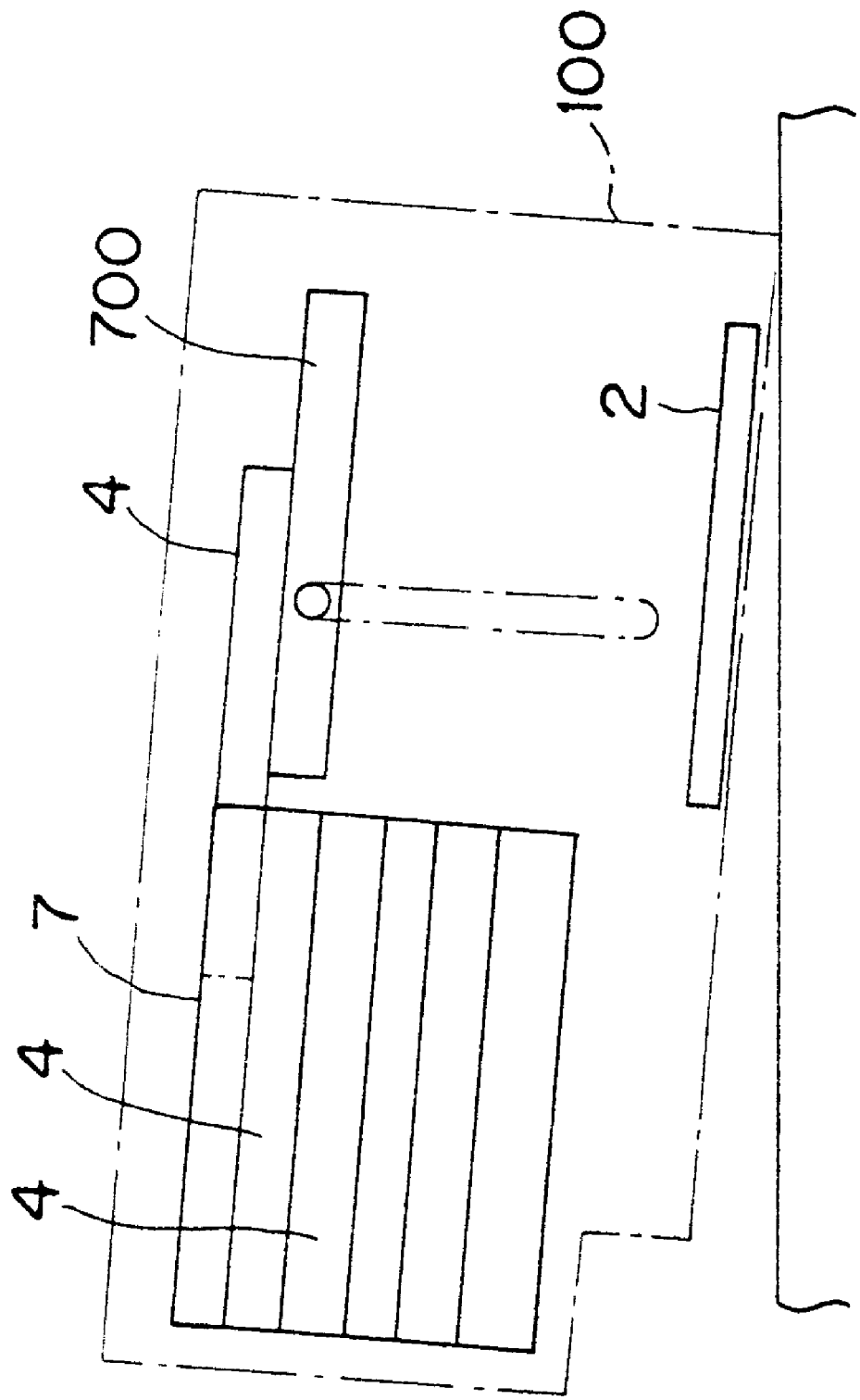
FIG. 46 is a side elevation showing the main body of the device as inclined.

FIG. 42 shows a sequence of steps for the ejection of the tray 4.

The path of movement of the tray 4 toward the recording-playback unit 2 can be blocked when the tray 4 is to be ejected alternatively by using a lift holder 20 of increased thickness for the unit 2 and moving the unit 2 to a level one stage higher than the tray 4 to be ejected. The tray 4 is then prevented from falling toward the unit 2 by the unit 2.

Figure 37:
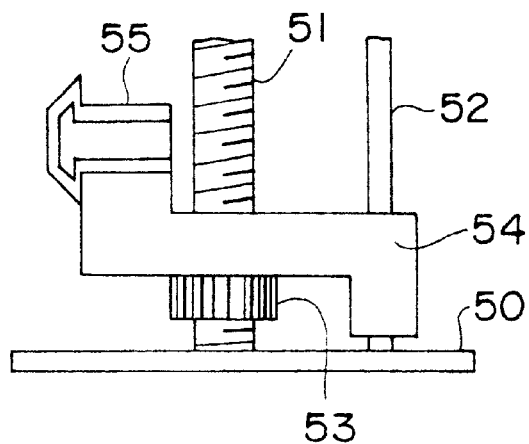
FIG. 37 is a front view showing the lift member as positioned in contact with the upper surface of a gear.

According to the embodiment described above, the bottom face of the lift member 54 bears on the upper face of the gear 53 when the lift member 54 is lowered completely as shown in FIG. 37. If the worm 51 is held in rotation, continuously pressing the lift member 54 against the gear 53 in this state of contact, the lift member 54 and the gear 53, which are made of synthetic resin, are likely to bite into each other. When the lift member 54 in such a biting state is to be subsequently raised, the resistance involved in the biting presents difficulty in raising the member 54.

Figure 38A:
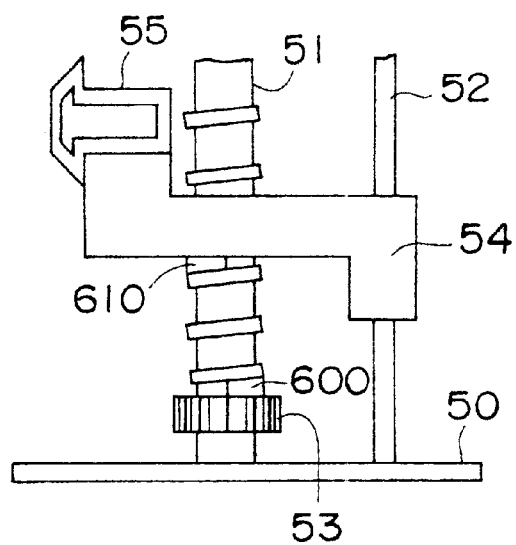
FIG. 38 includes side elevations showing the lift member as it is seen from inside, (a) showing the lift member during a descent, (b) showing a contact member as brought into contact with a contact piece.
Figure 38B:
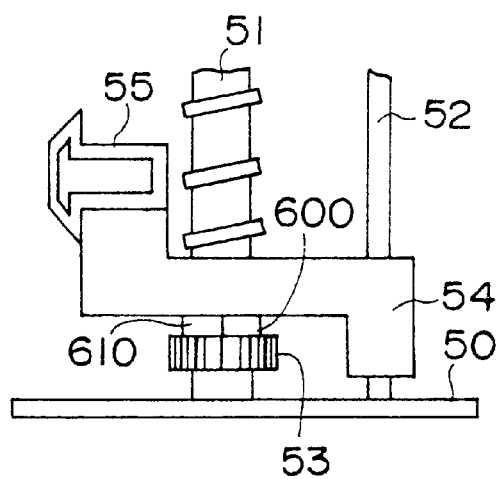

With reference to FIG. 38, (a), the present applicant has therefore conceived the idea of forming a contact piece 600 projecting from the upper face of the gear 53 and fitting in the furrow of the worm 51, and a contact member 610 projecting from the bottom of the lift member 54 and fitting in the furrow of the worm 51. so as to contact a side face of the contact piece 600. When the lift member 54 is completely lowered, the contact member 610 of the lift member 54 and the contact piece 600 of the gear 53 come into contact with each other at their opposed side faces. Since the area of contact between the member 610 and the piece 600 can be made smaller than when the bottom of the lift member 54 comes into bearing contact with the upper face of the gear 53, there is no likelihood of biting, permitting the lift member 54 to smoothly rise from the completely lowered position.

Similar means may be provided at the upper end of the worm 61. Furthermore, the recording-playback unit 2 and the worm 51 for moving the unit 2 upward or downward may also be provided with like means.

Figure 39:
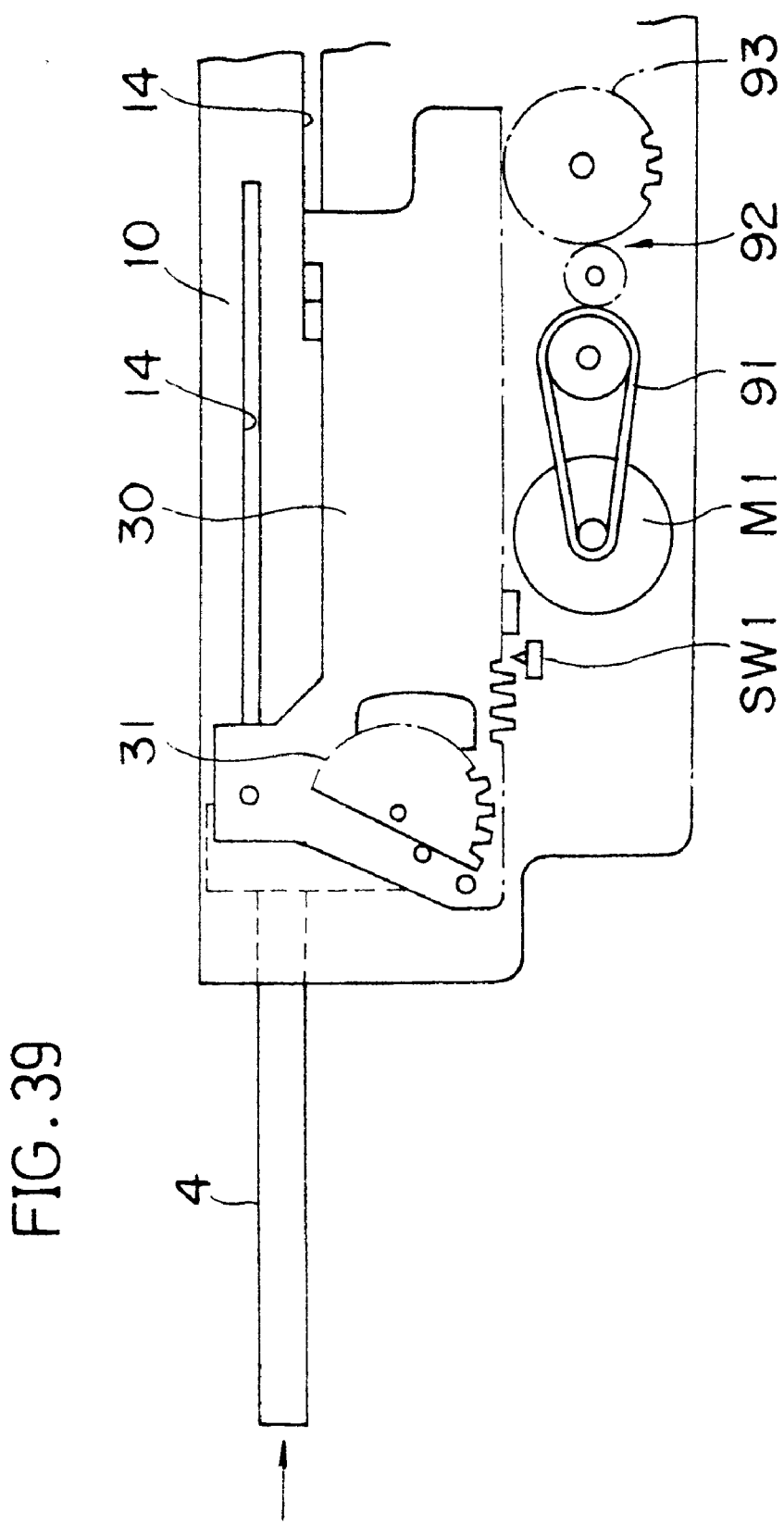
FIG. 39 is a side elevation showing a tray as manually pushed in from the ejected position.

When the tray 4 in the ejected position is pushed in by hand as seen in FIG. 39, the opening-closing slide 30 moves out of contact with the ejected position detecting switch SW1. Thus, there is a likelihood that the switch SW1 will be turned off although the processor 800 gives no signal commanding the energization of the motor M1. At this time, the motor M1 may be automatically energized to draw in the tray 4. In this case, the tray end face to be pushed may bear an indication of push-in action, 530, as indicated by the term "PUSH" in chain lines so as to show that the tray 4 can be pushed in manually.

What is claimed is:

1. A disk recording-playback device having mounted on a chassis a stacker accommodating trays in a plurality of stages for placing a disk on each tray, and a recording-playback unit positioned forwardly of the stacker and movable upward and downward, the trays being arranged between guide plates projecting inward from the stacker and corresponding to the respective stages, each of the trays being slidable between a closed position within the stacker and an ejected position in which the tray is projecting outward from the stacker, the device being characterized in that:

each of the trays comprises a main tray, and a subtray slidable on the main tray for placing the disk thereon, the main tray being slidable between the ejected position and the closed position, the subtray being releasably engageable with the main tray and slidable from the closed position further toward the recording-playback unit, each of the guide plates being formed with a cam portion for releasing the subtray from engagement with the main tray in the closed position and engaging the subtray with the main tray with the sliding movement of the main tray from the closed position to the ejected position.

2. A disk recording-playback device according to claim 1 wherein the subtray has a large recessed portion for placing a large disk therein, and a small recessed portion formed approximately concentrically with the large recessed portion for placing a small disk therein, and the guide plate laps over the large disk to be placed on the subtray to prevent the large disk from slipping out of the subtray.

3. A disk recording-playback device according to claim 2 wherein the main tray has a rib projecting from a bottom surface thereof and to be opposed to an upper surface of the small disk as positioned in the next lower stage.

\* \* \* \* \*